United States Patent
Ueda

(10) Patent No.: US 6,580,827 B2
(45) Date of Patent: *Jun. 17, 2003

(54) INFORMATION PROCESSING APPARATUS, METHOD AND MEMORY MEDIUM THEREFOR

(75) Inventor: Shigeru Ueda, Wako (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,020

(22) Filed: Jul. 29, 1998

(65) Prior Publication Data

US 2002/0057448 A1 May 16, 2002

(30) Foreign Application Priority Data

Jul. 29, 1997 (JP) .............................. 9-203213

(51) Int. Cl.[7] .............................. G06K 9/46; G06F 15/16
(52) U.S. Cl. ........................................ 382/232; 709/249
(58) Field of Search ............................... 382/232, 235, 382/244, 166, 312; 370/395, 463; 358/1.15; 439/701; 709/249, 201; 710/52, 127; 395/200.79, 200.31, 200.48

(56) References Cited

U.S. PATENT DOCUMENTS 5,838,926 A * 11/1998 Yamagishi .................. 709/249
5,933,430 A * 8/1999 Osakabe et al. ............ 370/395

FOREIGN PATENT DOCUMENTS

| EP | 0675634 | 10/1995 | ............. H04N/1/32 |
| EP | 0679013 | 10/1995 | ............. H04N/1/32 |

OTHER PUBLICATIONS

Teener, M., "A Bus On A Diet—Serial Bus Alternative. An Introduction To The P1394 High Performance Serial Bus", Proceedings Of The Computer Society International Conference, (COMPCON) Spring, US, Los Alamitos, IEEE Comp. Soc. Press, vol. Conf. 37, Feb. 24, 1992, pp. 316–321.

Bloks, R.H.J., "The IEEE—1394 high speed serial bus", Philips Journal Of Research, Elsevier, Amsterdam, NL, vol. 50, No. 1, 1996, pp. 209–216.

* cited by examiner

Primary Examiner—Andrew W. Johns
Assistant Examiner—Duy M. Dang
(74) Attorney, Agent, or Firm—Fitzpatrick, Cella, Harper & Scinto

(57) ABSTRACT

The invention intends to effect optimum output control according to the data transfer amount (bus band width) per unit time. For this purpose there is disclosed an information processing apparatus featured by identifying the data amount of synchronous transfer transmittable at every predetermined time, judging whether the image data of predetermined image quality can be transmitted within the identified data amount of synchronous transfer, setting the image quality of the image data to be transmitted in case the image data are judged not transmittable and generating the image data to be transmitted, with the set image quality.

20 Claims, 27 Drawing Sheets

FIG. 4A          DATA FIELD

| COMPRESSION FLAG | IMAGE DATA |
|---|---|

1: WITH COMPRESSION
2: WITHOUT COMPRESSION

FIG. 4B

| MODE SETTING COMMAND | MODE BIT | END-OF-COMMAND FLAG |
|---|---|---|

00: 600 DPI  256 GRADATION
01: 600 DPI   16 GRADATION
10: 300 DPI  256 GRADATION

FIG. 4C

| STATUS INQUIRY COMMAND | END-OF-COMMAND FLAG |
|---|---|

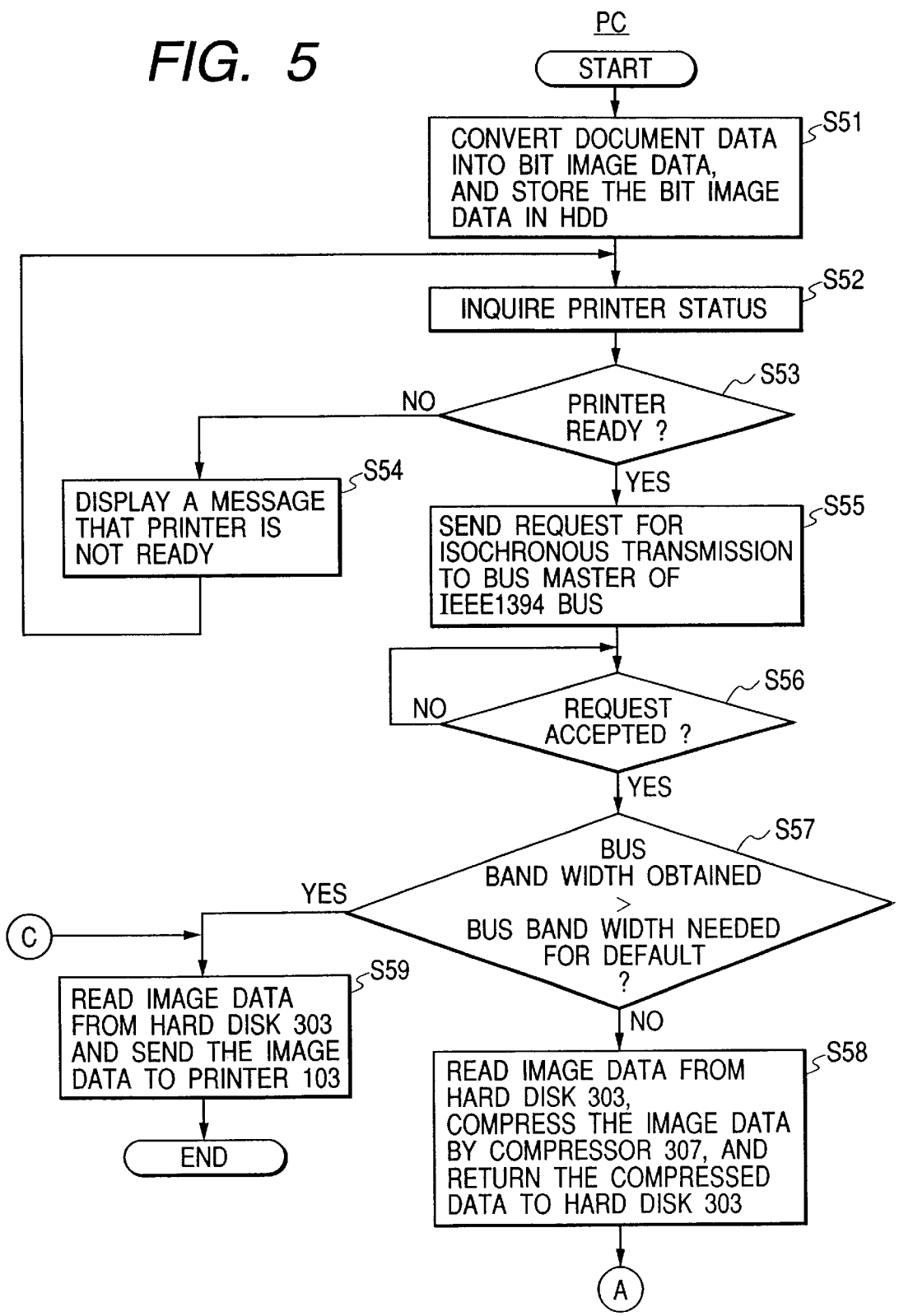

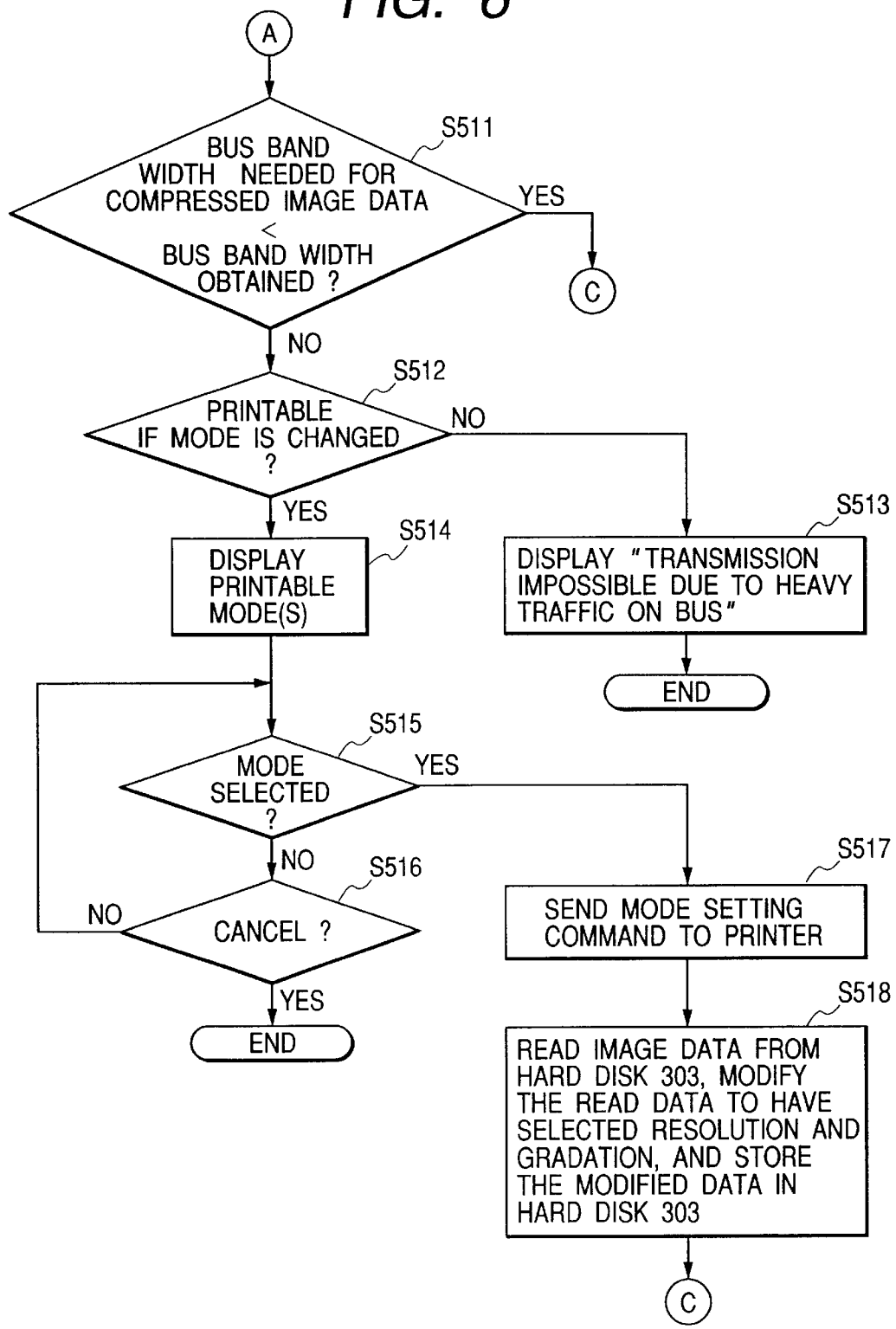

FIG. 25

| REGISTER 241 | | OPERATION MODE | INPUT-OUTPUT RELATION OF ROM 242 |
|---|---|---|---|
| QA (A0-INPUT) | QB (S-INPUT) | | |
| 0 | 0 | 600 DPI, 256 GRADATION | INPUT AT A1 TO A8 → OUTPUT AT P00 TO P07<br>INPUT AT A9 TO A16 → OUTPUT AT P10 TO P17 |
| 1 | 0 | NOT USED | — |
| 0 | 1 | 300 DPI, 256 GRADATION | INPUT AT A1 TO A8 → OUTPUT AT P00 TO P07<br>INPUT AT A9 TO A16 → OUTPUT AT P10 TO P17 |
| 1 | 1 | 600 DPI, 16 GRADATION | INPUT AT A1 TO A4 → OUTPUT AT P00 TO P03<br>INPUT AT A5 TO A8 → OUTPUT AT P10 TO P13<br>INPUT AT A9 TO A12 → OUTPUT AT P20 TO P23<br>INPUT AT A13 TO A16 → OUTPUT AT P30 TO P33 |

FIG. 26

| | ROM INPUT | | | | | | | | | | | | | | | | | ROM OUTPUT | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | A1 | A2 | A3 | A4 | A5 | A6 | A7 | A8 | A9 | A10 | A11 | A12 | A13 | A14 | A15 | A16 | D0 | D1 | D2 | D3 | D4 | D5 | D6 | D7 | D8 | D9 | D10 | D11 | D12 | D13 | D14 | D15 |
| | MULTIVALUE INPUT DATA D0 TO D3 (P0) | | | | MULTIVALUE INPUT DATA D0 TO D7 FOR P0 | | | | MULTIVALUE INPUT DATA D0 TO D7 FOR P1 | | | | | | | | | | | | | | | | | | | | | | |
| A0=0 | 0 | 0 | 0 | 0 | 0 | 0 | 0 | 0 | 0 | 0 | 0 | 0 | 0 | 0 | 0 | 0 | D0 | D1 | D2 | D3 | D4 | D5 | D6 | D7 | D8 | D9 | D10 | D11 | D12 | D13 | D14 | D15 |
| | 1 | 0 | 0 | 0 | 0 | 0 | 0 | 0 | 0 | 0 | 0 | 0 | 0 | 0 | 0 | 0 | P00 | P01 | P02 | P03 | P04 | P05 | P06 | P07 | P10 | P11 | P12 | P13 | P14 | P15 | P16 | P17 |
| | 0 | 1 | 0 | 0 | 0 | 0 | 0 | 0 | 0 | 0 | 0 | 0 | 0 | 0 | 0 | 0 | P00 | P01 | P02 | P03 | P04 | P05 | P06 | P07 | P10 | P11 | P12 | P13 | P14 | P15 | P16 | P17 |
| | 1 | 1 | 0 | 0 | 0 | 0 | 0 | 0 | 0 | 0 | 0 | 0 | 0 | 0 | 0 | 0 | P00 | P01 | P02 | P03 | P04 | P05 | P06 | P07 | P10 | P11 | P12 | P13 | P14 | P15 | P16 | P17 |
| | 0 | 0 | 1 | 0 | 0 | 0 | 0 | 0 | 0 | 0 | 0 | 0 | 0 | 0 | 0 | 0 | P00 | P01 | P02 | P03 | P04 | P05 | P06 | P07 | P10 | P11 | P12 | P13 | P14 | P15 | P16 | P17 |
| | ... | | | | | | | | | | | | | | | | | | | | | | | | | | | | | | | |
| | 0 | 1 | 1 | 1 | 1 | 1 | 1 | 1 | 1 | 1 | 1 | 1 | 1 | 1 | 1 | 1 | P00 | P01 | P02 | P03 | P04 | P05 | P06 | P07 | P10 | P11 | P12 | P13 | P14 | P15 | P16 | P17 |
| | 1 | 1 | 1 | 1 | 1 | 1 | 1 | 1 | 1 | 1 | 1 | 1 | 1 | 1 | 1 | 1 | P00 | P01 | P02 | P03 | P04 | P05 | P06 | P07 | P10 | P11 | P12 | P13 | P14 | P15 | P16 | P17 |
| | A1 | A2 | A3 | A4 | A5 | A6 | A7 | A8 | A9 | A10 | A11 | A12 | A13 | A14 | A15 | A16 | D0 | D1 | D2 | D3 | D4 | D5 | D6 | D7 | D8 | D9 | D10 | D11 | D12 | D13 | D14 | D15 |
| | MULTIVALUE INPUT DATA D0 TO D3 (P1) | | | | MULTIVALUE INPUT DATA D0 TO D3 (P2) | | | | MULTIVALUE INPUT DATA D0 TO D3 (P3) | | | | | | | | | | | | | | | | | | | | | | |
| A0=1 | 0 | 0 | 0 | 0 | 0 | 0 | 0 | 0 | 0 | 0 | 0 | 0 | 0 | 0 | 0 | 0 | D0 | D1 | D2 | D3 | D4 | D5 | D6 | D7 | D8 | D9 | D10 | D11 | D12 | D13 | D14 | D15 |
| | 1 | 0 | 0 | 0 | 0 | 0 | 0 | 0 | 0 | 0 | 0 | 0 | 0 | 0 | 0 | 0 | P00 | P01 | P02 | P03 | P10 | P11 | P12 | P13 | P20 | P21 | P22 | P23 | P30 | P31 | P32 | P33 |
| | 0 | 1 | 0 | 0 | 0 | 0 | 0 | 0 | 0 | 0 | 0 | 0 | 0 | 0 | 0 | 0 | P00 | P01 | P02 | P03 | P10 | P11 | P12 | P13 | P20 | P21 | P22 | P23 | P30 | P31 | P32 | P33 |
| | 1 | 1 | 0 | 0 | 0 | 0 | 0 | 0 | 0 | 0 | 0 | 0 | 0 | 0 | 0 | 0 | P00 | P01 | P02 | P03 | P10 | P11 | P12 | P13 | P20 | P21 | P22 | P23 | P30 | P31 | P32 | P33 |
| | 0 | 0 | 1 | 0 | 0 | 0 | 0 | 0 | 0 | 0 | 0 | 0 | 0 | 0 | 0 | 0 | P00 | P01 | P02 | P03 | P10 | P11 | P12 | P13 | P20 | P21 | P22 | P23 | P30 | P31 | P32 | P33 |
| | ... | | | | | | | | | | | | | | | | | | | | | | | | | | | | | | | |
| | 0 | 1 | 1 | 1 | 1 | 1 | 1 | 1 | 1 | 1 | 1 | 1 | 1 | 1 | 1 | 1 | P00 | P01 | P02 | P03 | P10 | P11 | P12 | P13 | P20 | P21 | P22 | P23 | P30 | P31 | P32 | P33 |
| | 1 | 1 | 1 | 1 | 1 | 1 | 1 | 1 | 1 | 1 | 1 | 1 | 1 | 1 | 1 | 1 | P00 | P01 | P02 | P03 | P10 | P11 | P12 | P13 | P20 | P21 | P22 | P23 | P30 | P31 | P32 | P33 |

FIG. 28

SINCE REQUIRED BUS BAND IS NOT OBTAINABLE
ON IEEE1394 BUS, THE DESIGNATED PRINTER CANNOT
PRINT IN THE DEFAULT MODE.
THE PRINTER CAN PRINT IN THE FOLLOWING MODES:

☐ 600 DPI,   16 GRADATION
☐ 300 DPI,  256 GRADATION

GO    CANCEL

INFORMATION PROCESSING APPARATUS, METHOD AND MEMORY MEDIUM THEREFOR

BACKGROUND OF THE INVENTION

1. Field of the Invention

The present invention relates to an information processing apparatus utilizing an interface with variable bus band width, and a method and a memory medium therefor.

2. Related Background Art

Among the peripheral equipment of the personal computer, most frequently used are hard disks and printers, and such peripherals are connected and communicate with the personal computer with a general digital interface for small computers, represented by SCSI.

Also recording/reproducing device such as a digital camera or a digital video camera is a peripheral of the personal computer, employed as input means therefor, and there has recently been remarkable progress, with increasing users, in the technology of fetching a still image or a moving image, taken with such digital camera or digital video camera, into the personal computer, then storing such image in the hard disk or editing such image on the personal computer and obtaining a color print of such image with a printer.

In outputting the fetched image data from the personal computer to the printer or the hard disk, the data are communicated without an interface such as SCSI mentioned above, and, for transmitting the information of a large data amount such as the image data, there is required a general-purpose digital interface with a high data transfer rate.

As the digital interface capable of meeting such requirement, the IEEE1394 is recently attracting attention.

However, as the IEEE1394 bus is connected to the personal computer and the peripherals such as the digital camera, the bus band width is assigned not only to the data transmission to the printer but also to the data exchange with other equipment, so that the bus band width or the data transfer amount per unit time is not constant. Consequently the data transfer cannot be realized with a high gradation and a high resolution, and the data transfer with a low gradation and a low resolution results in a printing operation with a low image quality even when a wide bus band width can be secured.

SUMMARY OF THE INVENTION

In consideration of the foregoing, the object of the present invention is to provide an information processing apparatus capable of optimum control according to the acquired bus band width, and an information processing method and a memory medium therefor.

The above-mentioned object can be attained, according to the present invention, by an information processing apparatus for generating image data in a generation unit and transmitting the generated image data by synchronous transfer through a transmission unit, the apparatus comprising identification means for identifying the data amount of synchronous transfer, transmittable through the transmission unit at every predetermined time; judgment means for judging whether the image data generated in the generation unit can be transmitted through the transmission unit within the data amount of synchronous transfer identified by the identification means; resetting means for resetting the image quality of the image data to be transmitted through the transmission unit in case the judgment means judges that the image data cannot be transmitted; and control means for causing the generation unit to generate the image data to be transmitted through the transmission unit with the image quality reset by the resetting means.

According to the present invention there is also provided an information processing method for use in an information processing apparatus for generating image data in a generation unit and transmitting the generated image data by synchronous transfer through a transmission unit, the method comprising an identification step of identifying the data amount of synchronous transfer, transmittable through the transmission unit at every predetermined time; a judgment step of judging whether the image data generated in the generation unit can be transmitted through the transmission unit within the data amount of synchronous transfer identified in the identification step; a resetting step of resetting the image quality of the image data to be transmitted through the transmission unit in case the judgment step judges that the image data cannot be transmitted; and a control step of causing the generation unit to generate the image data to be transmitted through the transmission unit with the image quality reset by the resetting step.

According to the present invention there is also provided a memory medium storing a computer readable program for use in an information processing apparatus for generating image data in a generation unit and transmitting the generated image data by synchronous transfer through a transmission unit, the program comprising an identification step of identifying the data amount of synchronous transfer, transmittable through the transmission unit at every predetermined time; a judgment step of judging whether the image data generated in the generation unit can be transmitted through the transmission unit within the data amount of synchronous transfer identified in the identification step; a resetting step of resetting the image quality of the image data to be transmitted through the transmission unit in case the judgment step judges that the image data cannot be transmitted; and a control step of causing the generation unit to generate the image data to be transmitted through the transmission unit with the image quality reset by the resetting step.

BRIEF DESCRIPTION OF THE DRAWINGS

FIGS. 4A, 4B and 4C are views showing various commands transmitted from the host computer to the printer;

FIGS. 5 and 6 are flow charts showing the process sequence in a host computer embodying the present invention;

FIG. 25 is a table showing the relationship between the setting of a register 241 and the operation modes thereof;

FIG. 26 is a view showing a table stored in a ROM 242;

FIG. 28 is a view showing an example of the image displayed on the host computer.

DESCRIPTION OF THE PREFERRED EMBODIMENTS

Figure 1:
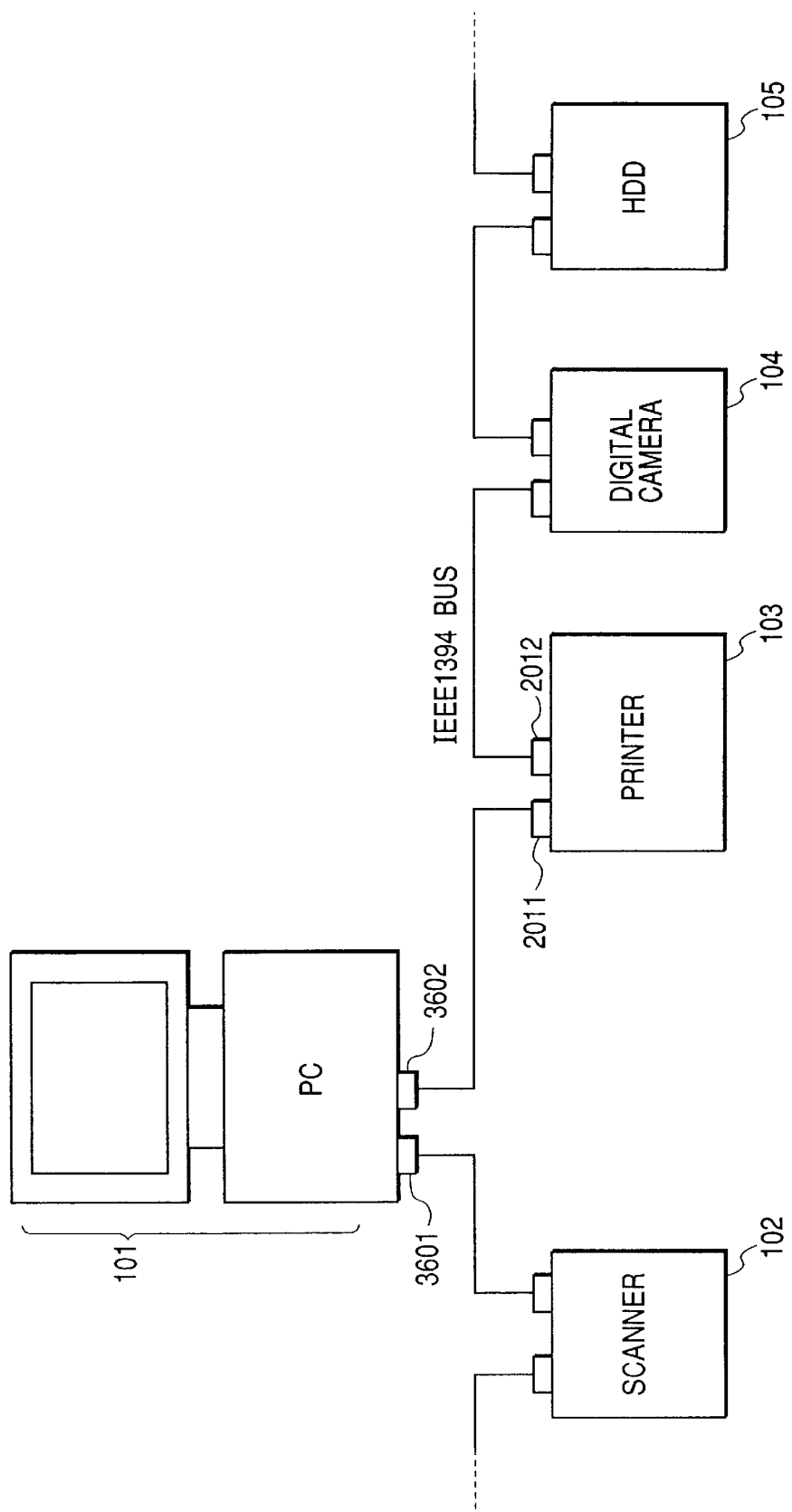
FIG. 1 is a view showing an example of the network embodying the present invention.

FIG. 1 shows an example of the network configuration in which the present invention is applicable.

FIG. 1 shows the state of connection of a personal computer, a printer etc. Connected through the IEEE1394 interface.

As the digital I/F employed in the present invention for connecting various equipment is composed of the IEEE1394 serial bus, there will at first be given an explanation on the IEEE1394 serial bus.

[Outline of IEEE1394 Technology]

With the commercialization of consumer digital video cassette recorder and digital video disk, it has become necessary to support the real-time data transfer of a large data amount, such as video data or audio data. For realizing the real-time transfer of such video data or audio data for fetching into the personal computer or transmission to other digital equipment, there is required a high-speed interface with necessary transfer functions, and the IEEE1394-1995 interface (high performance serial bus; hereinafter called 1394 serial bus) has been developed on such background.

Figure 7:
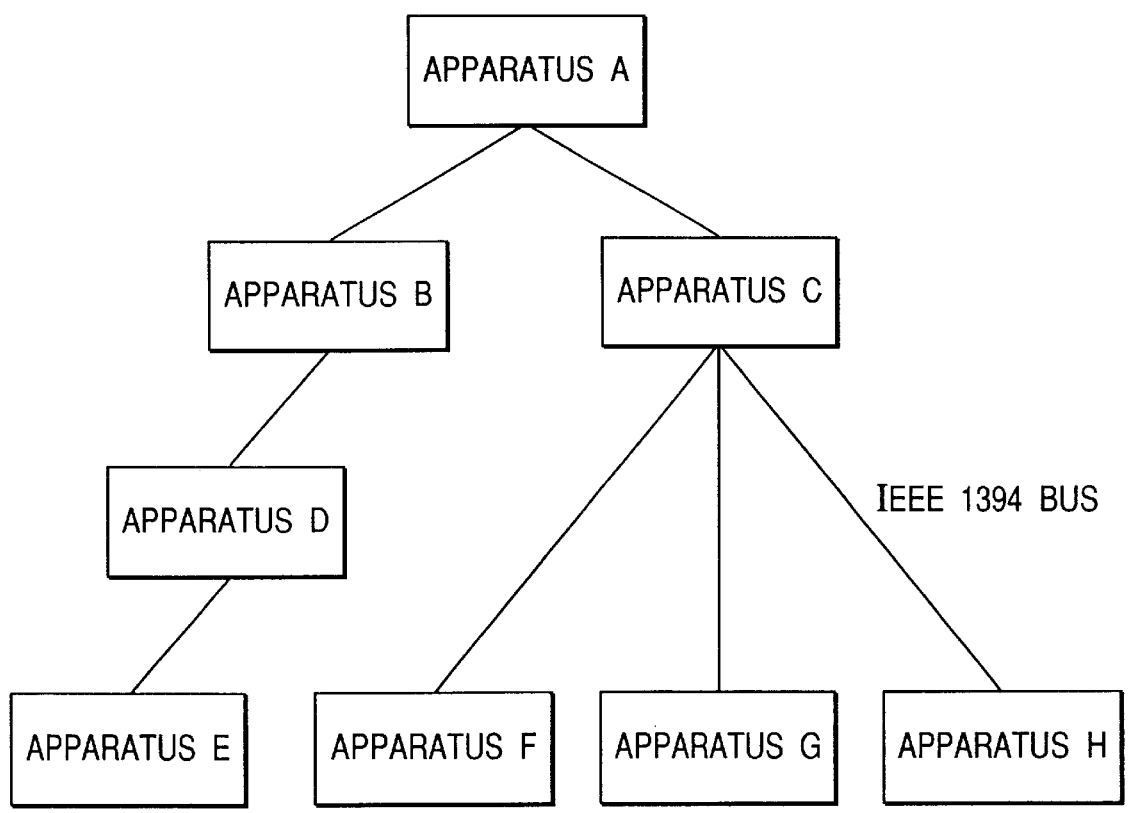
FIG. 7 is a view showing an example of the network configuration connected with the 1394 serial bus.

FIG. 7 shows an example of the network system constructed with the 1394 serial bus. The system consists of apparatus A, B, C, D, E, F, G and H, and each of the connections A-B, A-C, B-D, D-E, C-F, C-G and C-H is made with a twisted pair cable of the 1394 serial bus. The apparatus A to H can be, for example, a personal computer, a digital VCR, a DVD, a digital camera, a hard disk, a monitor etc.

Figure 8:
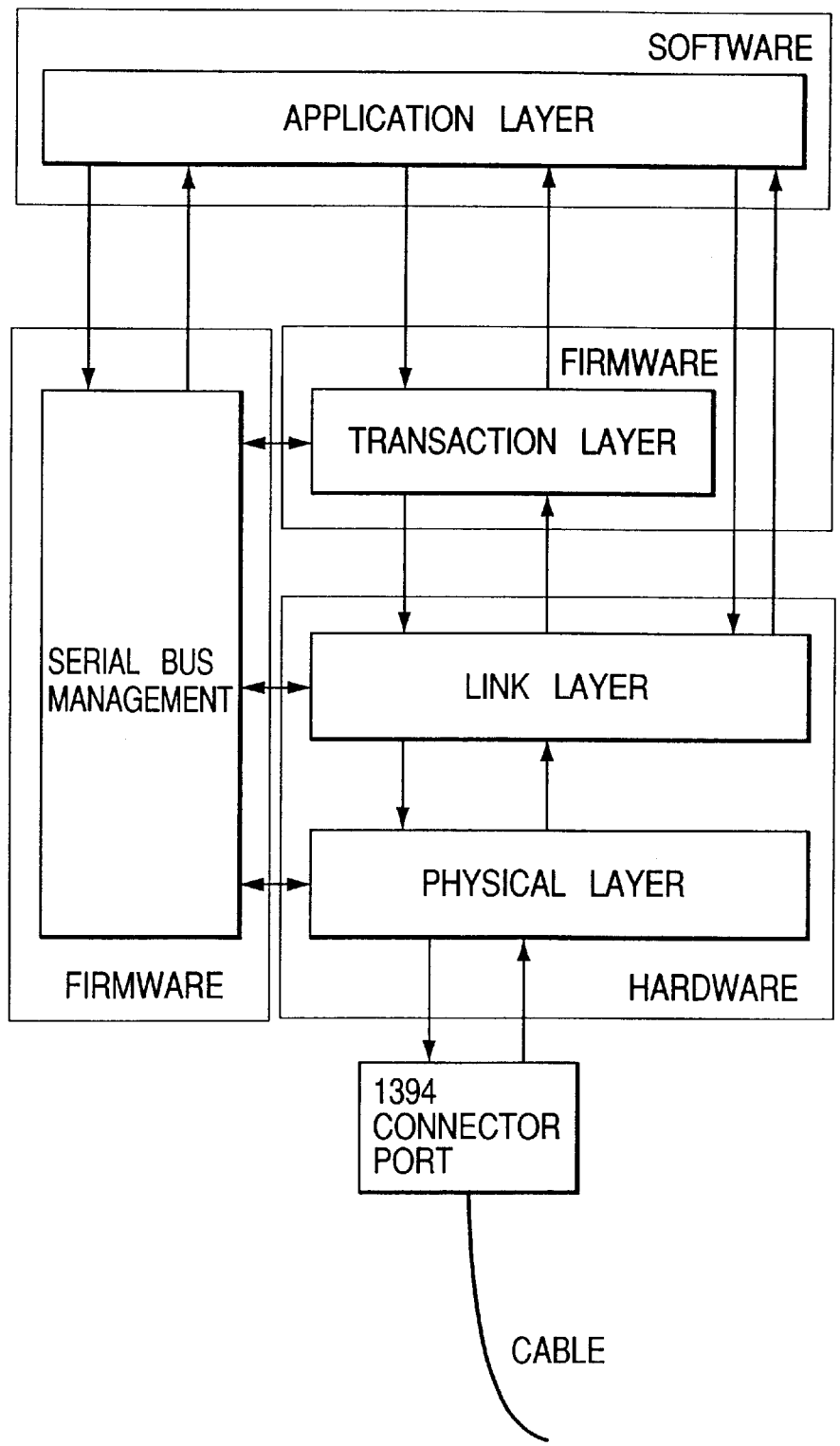
FIG. 8 is a view showing the components of the 1394 serial bus.

The apparatus can be connected with a large freedom, by the mixture of daisy chain method and node branched method. Each apparatus has its own ID, and such ID's are mutually recognized whereby a network is constituted within the range of connections with the 1394 serial buses. Each digital apparatus is connected with a 1394 serial bus in succession whereby each apparatus performs a relaying function so that all the apparatus constitute a single network. Also when the cable is connected to the apparatus, the apparatus itself and the connection status thereof can be automatically recognized by the plug and play function, which is a feature of the 1394 serial bus. Also in a system as shown in FIG. 7, when an apparatus is deleted from the system or added thereto, the bus is automatically reset so that the network configuration is reset and reconstructed anew. This function allows to constantly set and recognize the current network configuration. The data transfer rate is available in 100, 200 or 400 Mbps, and the apparatus having an upper transfer rate supports the lower transfer rate to achieve compatibility. The data transfer can be achieved in an asynchronous transfer mode for transferring asynchronous data (hereinafter also written as async data) such as control signals, or in an isochronous transfer mode for transferring real-time isochronous data (hereinafter also written as iso data) such as video or audio data. The asynchronous data and the isochronous data are transferred in mixed manner within each cycle (usually 125 $\mu$sec), following the transfer of a cycle start packet (CSP) indicating the start of a cycle, with priority given to the isochronous data. FIG. 8 shows the components of the 1394 serial bus, having layered structure.

As shown in FIG. 8, the hardware component is constituted by a 1394 serial bus cable, of which connector is connected to a connector port. On this port there are provided a physical layer and a link layer, both constituting a hardware realized by an interface chip. The physical layer control the encoding and the connector, while the link layer controls the packet transfer and the cycle time. A transaction layer realized as a firmware manages the data to be transferred (transaction) and generates read and write commands. A serial bus management manages the connection status and ID of the connected apparatus, thereby managing the configuration of the network. The above-mentioned hardware and firmware substantially constitute the 1394 serial bus.

An application layer, realized by a software and varying according to the software to be used, defines the state of data on the interface and is defined by a protocol such as the AV protocol. The 1394 serial bus is constructed as explained in the foregoing.

Figure 9:
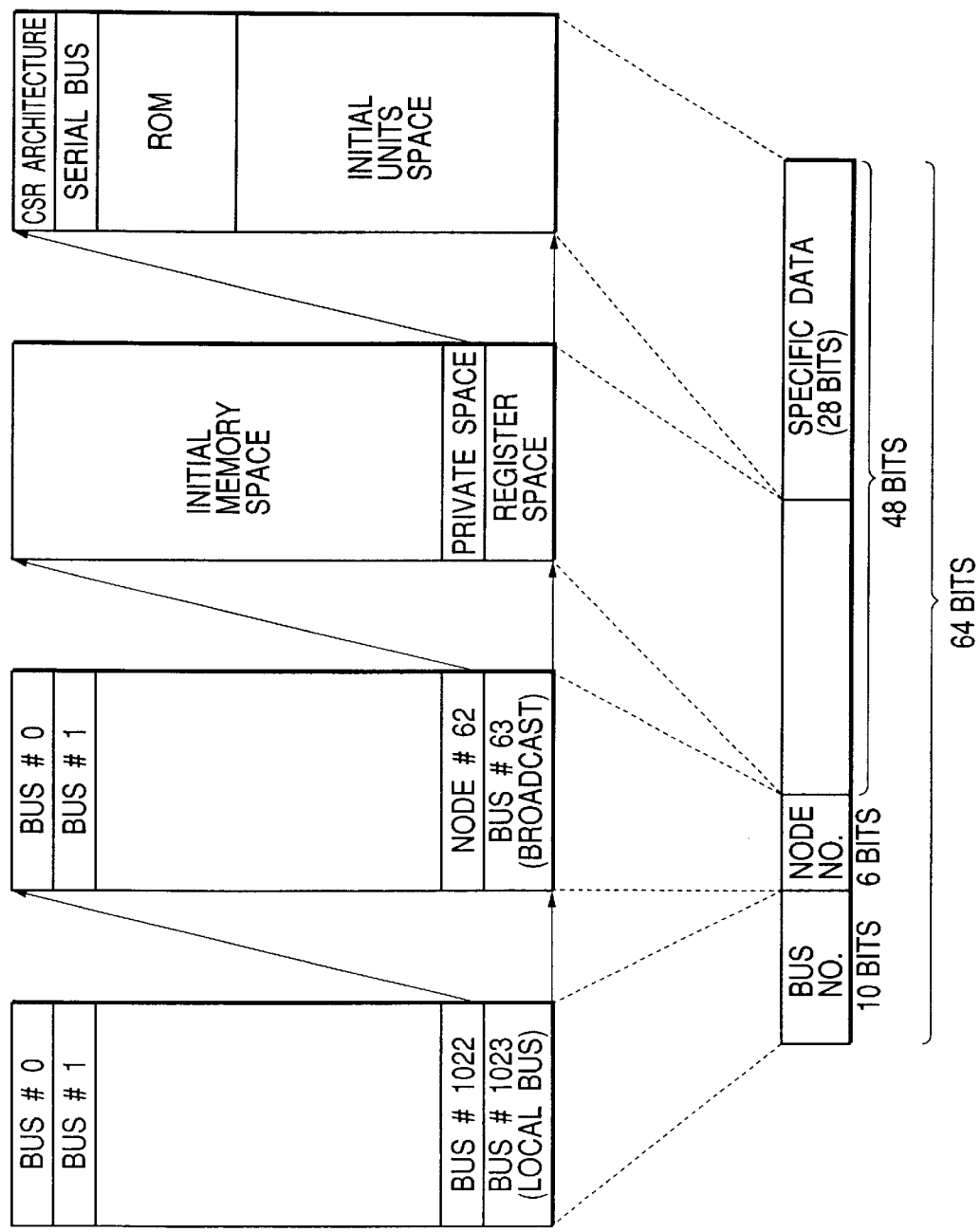
FIG. 9 is a view showing the address map of the 1394 serial bus.

FIG. 9 shows the address space in the 1394 serial bus.

Each apparatus (node) connected to the 1394 serial bus is given a 64-bit address specific to such node. This address is stored in a ROM, so that each apparatus can always recognize its own node address and the node addresses of other apparatus and can execute communicate with the designated partner. The addressing of the 1394 serial bus is based on the IEEE1212 standard, and, in the address, initial 10 bits are used for designating the bus number and next 6 bits are used for designating the node ID number. Subsequent 48 bits constitute the address width assigned to the apparatus and usable as the specific address space. Final 28 bits are used as an area of specific data, for storing the information identifying various apparatus or designating the condition of use. The 1394 serial bus technology is constructed as outlined above.

In the following there will be given a detailed explanation on the technologies featuring the 1394 serial bus.

[Electric Specifications of 1394 Serial Bus]

Figure 10:
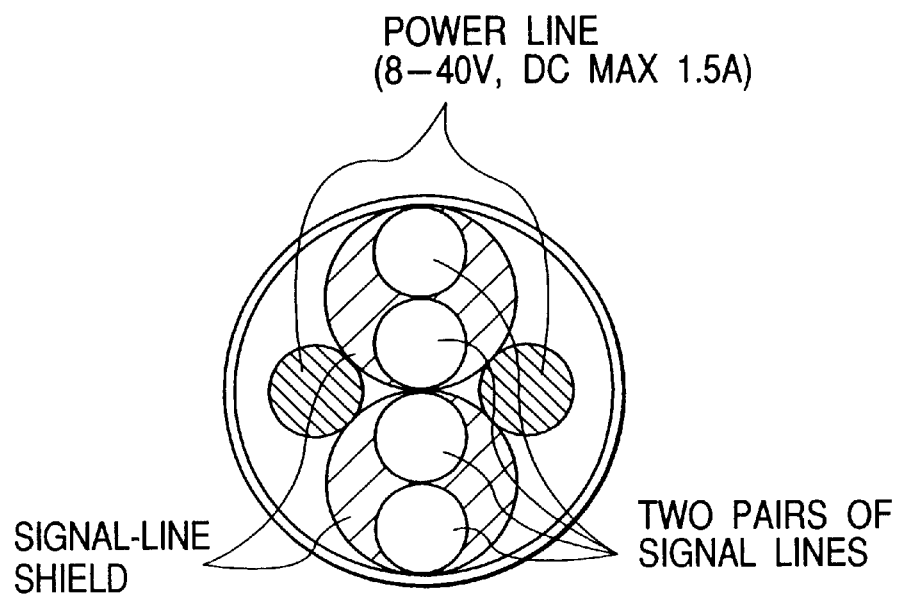
FIG. 10 is a cross-sectional view of the 1394 serial bus cable.

FIG. 10 is a cross-sectional view of the 1394 serial bus cable, which includes two sets of twisted-pair signal lines and power supply lines which achieves power supply to an apparatus without power source or an apparatus in which the voltage is lowered by a failure.

The electric power supplied in the power supply lines has a voltage of 8 to 40 V and a DC current of 1.5 A at maximum.

[DS-link Encoding]

Figure 11:
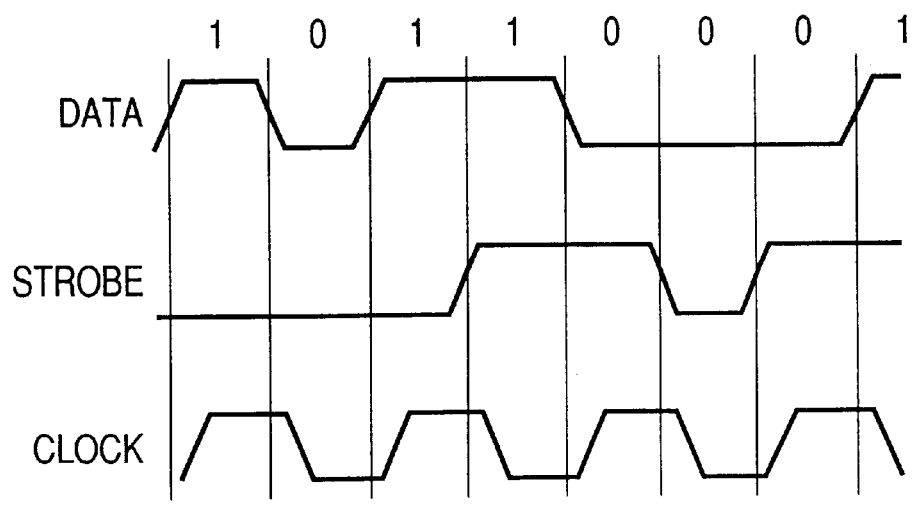
FIG. 11 is a view showing the DS-Link encoding method.

FIG. 11 shows the principle of the DS-link encoding method for the data transfer format employed in the 1394 serial bus. The 1394 serial bus employs the DS-link (data/strobe link) encoding method, which is suitable for high-speed serial data communication and requires two signal lines. Main data are transmitted by one of the twisted paired lines, while a strobe signal is transmitted by the other. At the receiving side, the clock signal can be reproduced by calculating the exclusive logic sum of the communicated data and the strobe signal. The DS-link encoding method has the advantages of a higher transfer efficiency in comparison with other serial data transfer method, a smaller circuit magnitude of the controller LSI because the PLL circuit can be dispensed with, and a reduction in the electric power consumption because, in the absence of the data to be transferred, the transceiver circuit of each apparatus can be shifted into a sleep state as the information indicating the idle state need not be transmitted.

[Sequence of Bus Resetting]

In the 1394 serial bus, each connected apparatus (node) is given a node ID and is recognized in the network configuration. In case it becomes necessary to recognize the new network configuration because of a change in the network configuration, for example by a change in the number of nodes by the addition or deletion of a node or by the on/off operation of power supply, each node detecting such change transmits a bus reset signal to the bus and enters a mode of recognizing the new network configuration. Such change is detected by detecting a change in the bias voltage on the 1394 port board. Receiving the bus reset signal from a node, the physical layer of each node transmits the generation of bus resetting to the link layer and also transmits the bus reset signal to other nodes. The bus resetting is activated when all the nodes finally detect the bus reset signal. The bus resetting is also activated by a hardware detection in case of attaching or detaching of the cable or an abnormality in the network, or by a direct command to the physical layer from the host equipment in protocol control. Once the bus resetting is activated, the data transfer is suspended, and is re-started, after the completion of the bus resetting, under the new network configuration.

[Sequence of Node ID Determination]

Figure 19:
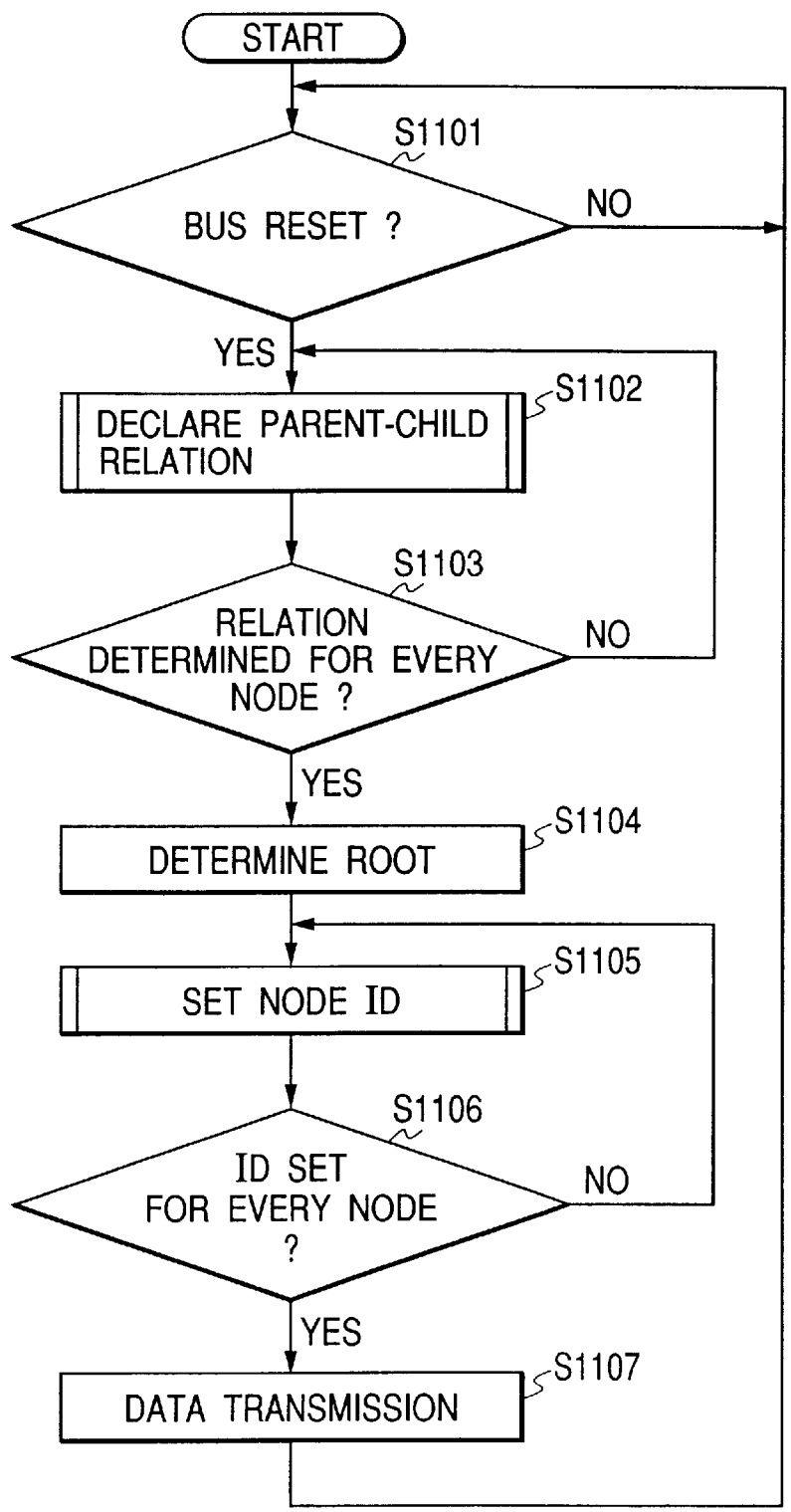
FIG. 19 is a flow chart showing the flow from the bus resetting to the node ID determination.

After the bus resetting, each node enters an operation of assigning the ID to each node for constructing the new network configuration. In the following there will be explained, with reference to flow charts in FIGS. 19, 20 and 21, a general sequence from the bus resetting to the node ID determination. FIG. 19 shows the sequence of bus operations from the start of the bus resetting to the determination of the node ID whereupon the data transfer is enabled.

A step S1101 constantly monitors the start of bus resetting in the network, and, if the bus resetting is generated for example by an on/off operation of the power supply in a node, the sequence proceeds to a step S1102, in which, in the reset state of the network, the parent-child relationship is declared between the directly connected apparatus in order to identify the connection state of the new network. When a step S1103 identifies the determination of the parent-child relation in all the nodes, a step S1104 determines a root. The declaration of the parent-child relationship in the step S1102 is continued, and the root is not determined, until the parent-child relationship is determined in all the nodes. After the determination of the root in the step S1104, a step S1105 executes a node ID setting operation for giving the ID to each node. The node ID is set repeatedly in a predetermined order of nodes until the ID's are given to all the nodes. When a step S1106 identifies that the ID's are set in all the nodes, the new network configuration is recognized in all the nodes and the data transfer is enabled among the nodes, whereupon a step S1107 initiates the data transfer. In the state of the step S1107, there is again entered the mode of monitoring the generation of bus resetting, and, in case of generation of a bus resetting, there is again repeated the setting operations of the steps S1101 to S1106.

Figure 20:
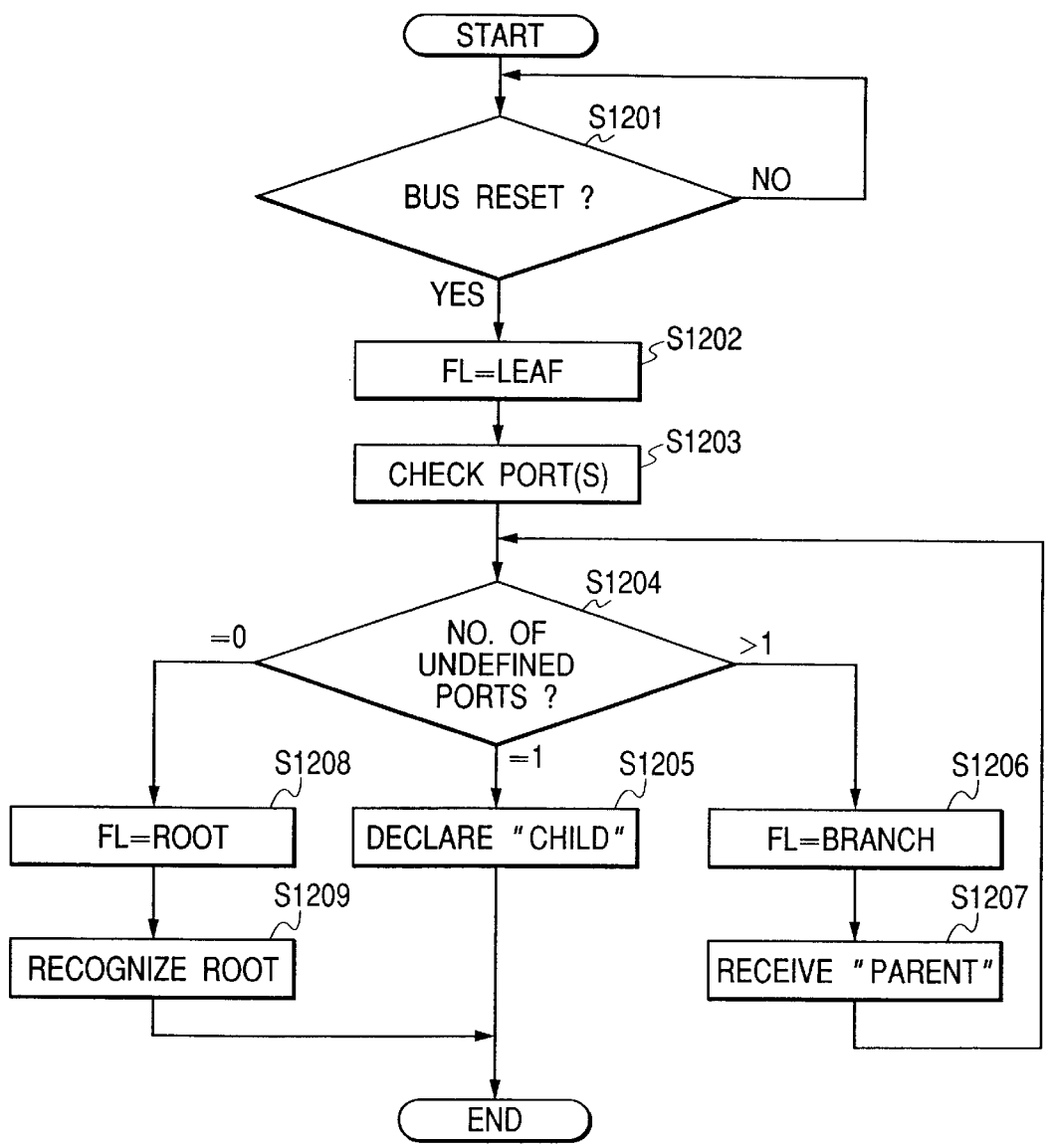
FIG. 20 is a flow chart showing the flow of parent-child relationship determination at bus resetting.
Figure 21:
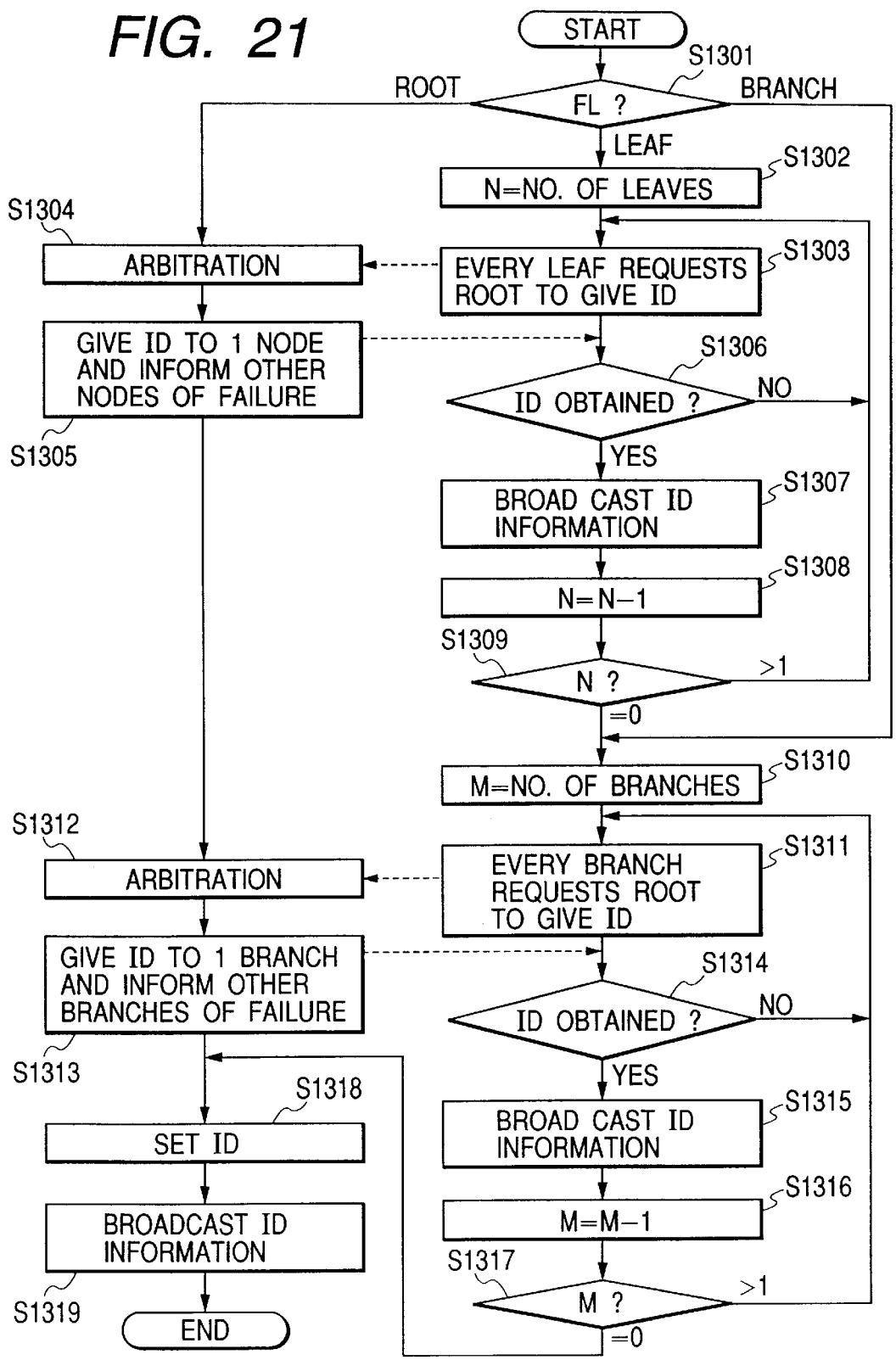
FIG. 21 is a flow chart showing the flow from the parent-child relationship determination at bus resetting to the node ID determination.

Within the flow chart shown in FIG. 19, a part from the bus resetting to the root determination and a part after the root determination to the completion of ID setting are respectively shown in FIGS. 20 and 21 in more detailed manner. In the following there will be explained the flow chart shown in FIG. 20.

A step S1201 constantly monitors the generation of bus resetting, and, if generated, the network configuration is reset. Then, as a first step of recognizing again the connection state of the reset network, a step S1202 sets a flag indicating a leaf (node) in each apparatus. Then, in a step S1203, each apparatus checks the number of ports thereof connected to other nodes. In order to start the declaration of the parent-child relationship based on the checked number of ports, a step S1204 checks the number of undefined ports (for which the parent-child relationship is not determined). Immediately after the bus-resetting, the number of ports is equal to the number of undefined ports, but, with the progress of determination of the parent-child relationships, the number of undefined ports detected in the step S1204 changes. Immediately after the bus resetting, the parent-child relationship can only be declared by a leaf. Being a leaf can be known by the confirmation of the port number in the step S1203. In a step S1205, a leaf declares, to a node connected thereto, that "the leaf is a child and the node is a parent" and terminates the operation. As a node which is identified to have plural ports and to be a branching node in the step S1203 has a number of undefined ports larger than 1 in the step S1204, it proceeds to a step S1206 in which a branch flag is set. Then it waits in a step S1207 to accept "parent" in the parent-child declaration from the leaf. A branch, which receives the "parent" position in the step S1207 in the parent-child declaration by the leaf, confirms the number of the undefined ports in the step S1204, and, if the number of the undefined ports becomes 1, it can declare that "it is a child" in the step S1205 to the node connected to the remaining port. A branch which has two or more undefined ports in the step S1204 waits again in the step S1207 for accepting the declaration of "parent" from a leaf or another branch. When the number of undefined ports confirmed in the step S1204 becomes finally zero in any branch or, exceptionally, in a leaf (because of a late declaration of child), the declarations of the parent-child relationship are completed in the entire network, and a step S1208 sets a root flag in the unique node in which the number of undefined ports has become zero (all ports being defined) and a step S1209 recognizes such node as the root. In this manner the operations from the bus resetting to the declarations of the parent-child relationship in all the nodes of the network as shown in FIG. 20 are completed.

In the following there will be explained the flow chart shown in FIG. 21. At first a step S1301 classifies the flag information of the nodes defined as leaves, branches and root in the sequence shown in FIG. 20. The ID setting to the nodes can be started from leaves. The ID's are set from the smallest number of node (starting from node number 0), in the order of leaves, branches and root. A step S1302 sets a number N (natural number) of the leaves present in the network. Then, in a step S1303, each leaf issues a request for the ID to the root. In case of plural requests, the root executes an arbitration in a step S1304, and a step S1305 gives the ID number to the winning node and informs the losing node of the failure. In a step S1306, the leaf that has failed in acquiring the ID issues again the request for ID, and a similar operation is repeated. A leaf that has acquired the ID transfers the ID, by broadcasting in a step S1307, to all the nodes. After a broadcasting of the node ID information, a step S1308 decreases the number of the remaining leaves. If a step S1309 discriminates that the number of remaining leaves is at least one, the process starting from the ID request in the step S1303 is repeated. When all the leaves broadcast the ID information, the step S1309 identifies N=0, whereupon the ID setting for the branches is initiated in a similar manner as that for the leaves. At first a step S1310 sets a number M (natural number) of the branches present in the network. Then, in a step S1311, each branch issues a request for the ID to the root. The root executes an arbitration in a step S1312, and gives the ID numbers, starting from a smallest ID number next to those given to the leaves, to the winning branches. A step S1313 gives the ID number to the winning node and informs the losing node of the failure. In a step S1314, the branch that has failed in acquiring the ID issues again the request for ID, and a similar operation is repeated. A branch that has acquired the ID transfers the ID, by broadcasting in a step S1315, to all the nodes. After a broadcasting of the node ID information, a step S1316 decreases the number of the remaining branches. If a step S1317 discriminates that the number of remaining branches is at least one, the process starting from the ID request in the step S1311 is repeated until the ID information is broadcast from all the branches. When all the branches acquire the ID information, the step S1317 identifies M=0, whereupon the ID acquisition mode for the branches is terminated. At this state, the root, being the only node that has not acquired the ID information, assigns the smallest available number as its own ID number in a step S1318, and a step S1319 broadcasts the ID information of the root. In this manner the sequence shown in FIG. 21, after the determination of the parent-child relationship to the ID setting for all the nodes, is completed.

In the following there will be explained the functions of the actual network, shown as an example in FIG. 12.

Figure 12:
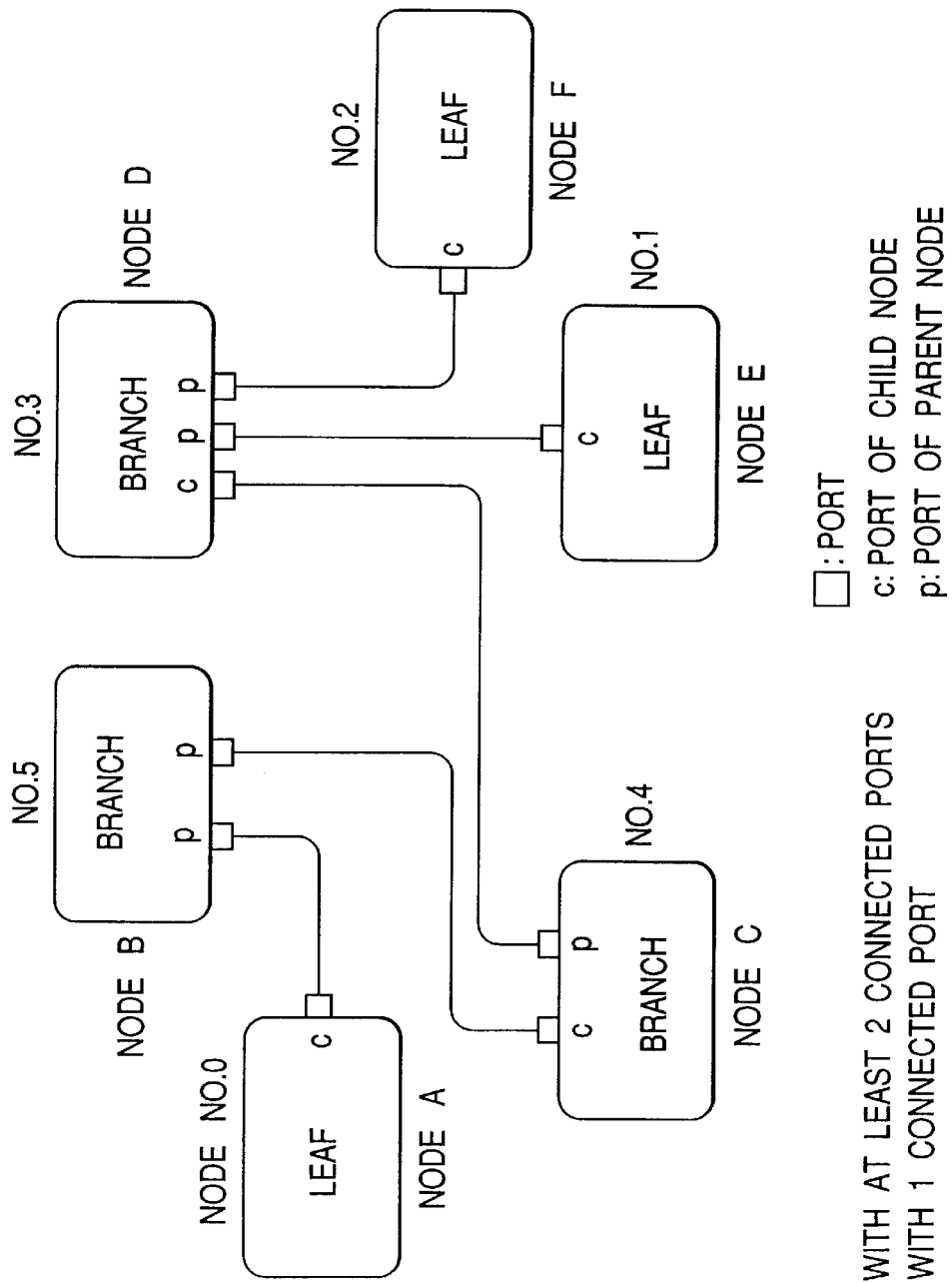
FIG. 12 is a view showing the topology setting for node ID determination in the 1394 serial bus.

As shown in FIG. 12, the network has a hierarchic structure in which nodes A, C are positioned under a root node B and directly connected thereto; a node D is directly connected under the node C; and nodes E, F are directly connected under the node D. In the following there will be explained the procedure of determining such hierarchic structure, the root node and the node ID's. After the bus resetting, the parent-child relationship is declared between the directly connected ports of the nodes, in order to recognize the connection state of the nodes. In the parent-child relationship, the parent assumes a higher rank in the hierarchic structure while the child assumes a lower rank. In the example shown in FIG. 12, the parent-child relationship is declared at first by the node A. The declaration can be basically made by a node that has connection at only one port thereof (such node being called leaf). Such node can detect that it has connection at only one port and can thus recognize it constitutes an end in the network, and the parent-child relationship is determined from the fastest reacting one among such nodes. Thus, the port of the declaring node (node A in the connection A-B) is set as a child, while the port of the other node (node B) is set as a parent. In this manner the child and the parent are respectively set in the nodes A-B, E-D and F-D. Then the process moves up to the next upper layer, and the parent-child relationship is declared to the still upper layer by the nodes having plural connections (such node being called branch), starting from those which have received the declaration of the parent-child relationship from other nodes. In the example shown in FIG. 12, after the determination of the parent-child relationship between the nodes D-E and D-F, the node D declares the parent-child relationship to the node C whereby the node D and C are respectively determined as the child and the parent between these nodes. Having received the declaration from the node D, the node C declares the parent-child relationship to the node B connected to another port of the node C, whereby the node C and B are respectively determined as the child and the parent between these nodes. In this manner the hierarchic structure as shown in FIG. 12 is constructed, and the node B, which has become the parent finally in all the connected ports, is determined as the root node. There is only one root within the network.

In the example shown in FIG. 12, the node B is determined as the root node, but another node may become the root node if the node B, having received the declaration of the parent-child relationship from the node A, executes the declaration of the parent-child relationship to other nodes at an earlier timing. Stated differently, any node can become the root node depending on the timing of transmission, so that the root node is not necessarily fixed even within a same network structure.

Once the root node is determined, there is initiated the mode of determining the ID's of the nodes. In this mode, each node informs its own determined ID to all other nodes (broadcasting function).

The information of own ID contains the own ID number, information on the connected position, number of ports, number of connected ports, information on the parent-child relationship on each port etc. The procedure of assignment of the node ID numbers can be activated from nodes (leaves) having connection at only one port, and the node numbers are assigned sequentially in the order of 0, 1, 2, . . . among such nodes. The node that has acquired the node ID transmits the information, including the node number, to all the nodes by broadcasting, whereby such ID number is recognized as 'already assigned'. When all the leaves have acquired the own node ID's, the procedure is shifted to the branches and the node ID numbers subsequent to those assigned to the leaves are sequentially assigned to the branches. As in the case of leaf, the branches having acquired the node ID numbers broadcast the node ID information in succession, and finally the root node broadcasts the own ID information. Consequently, the root node always have the large node ID number.

With the above-described node ID assignment for the entire hierarchic structure, the network configuration is reconstructed and the bus initialization is completed.

[Arbitration]

Figure 13A:
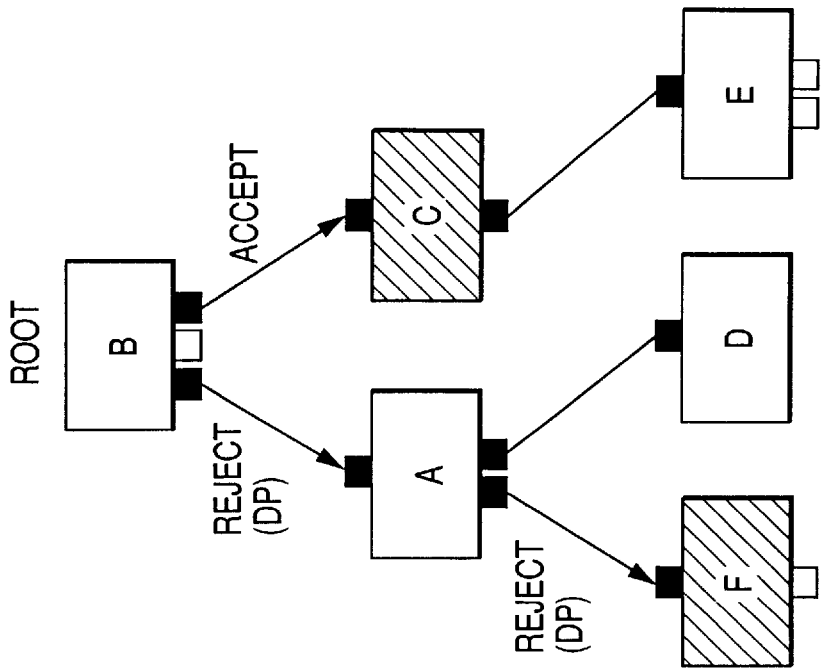
FIGS. 13A and 13B are views showing the arbitration process in the 1394 serial bus.
Figure 13B:
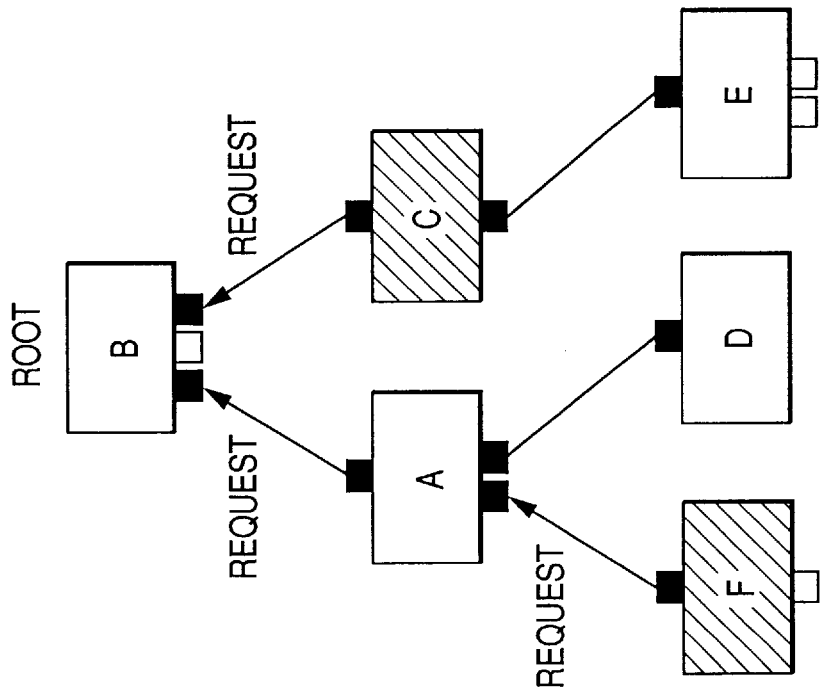

In the 1394 serial bus, there is always conducted an arbitration of the right to use the bus, prior to the data transfer. As the 1394 serial bus constitutes a logical network in which each apparatus individually connected relays the transferred signal in such a manner that the transferred signal can be transferred equally to all the apparatus in the network, the arbitration process is required to prevent the collision of the packets, thereby allowing that only one node executes signal transfer at a given time. The arbitration process will be explained in the following with reference to FIG. 13A showing a state of requesting the use of bus, and FIG. 13B showing a state of permitting the use of bus.

When the arbitration is started, one or plural nodes respectively issue requests for the bus use right to the parent node. In FIG. 13A, nodes C and F issue such requests. In response, the parent node (node A in FIG. 13A) issues (relays) the request to the upper parent node. The requests are finally delivered to the root node which executes the arbitration.

In response to such requests, the root node determines a node to use the bus. This arbitrating operation can only be executed by the root node, and the permission to use the bus is given to the winning node of the arbitration. In FIG. 13B, the permission for the use is given to the node C, but the use by the node F is rejected. A DP (data prefix) packet is transmitted to the losing node in the arbitration, in order to advise the state of rejection. The request for the bus use right of the losing node has to wait until the next arbitration.

The node, having won the arbitration and acquired the bus use right, can initiate the data transfer. The sequence of arbitration will be explained in the following with reference to FIG. 22.

In order that the node can start data transfer, the bus has to be in an idle state. Each node judges, upon lapse of a predetermined idle time gap length (subaction gap) after the end of a preceding data transfer, that the bus is in the idle state and that it can start the data transfer. A step S1401 discriminates whether there has been obtained a gap length, determined in advance according to the data to be transferred such as async data or iso data. The node waits until such predetermined gap length is obtained, since the bus use right for starting the data transfer cannot be requested unless such predetermined gap length is obtained. When the step S1401 identifies that the predetermined gap length has been obtained, a step S1402 discriminates whether the data to be transferred are present, and, if present, a step S1403 issues a request for the bus use right to the root, in order to secure the bus for data transfer. In this operation, the signal representing the request for the bus use right is relayed by the apparatus in the network as shown in FIGS. 13A and 13B, and is finally delivered to the root. If the step S1402 identifies the absence of the data to be transferred, the node enters a waiting state. When the root receives, in a step S1404, one or more requests for the bus use right issued in the step S1403, the root checks the number of requesting nodes in a step S1405. If the step S1405 identifies that the number of requesting nodes is 1, such node is given the permission to use the bus immediately thereafter. If the step S1405 identifies that there are plural requesting nodes, the root executes the arbitration for determining a node to which the permission is to be given. The arbitration is made fair to all the nodes so that all the nodes have equal chances of acquiring permission, without such a situation that a same node acquires the permission every time. A step S1407 divides, among the plural nodes issuing the requests in the step S1406, a node which acquires the permission to use by the arbitration of the root and other losing nodes. In a step S1408, the root sends a permission signal to the node which acquires the permission to use as the result of arbitration or which acquires the permission without the arbitration in case the step S1405 identifies that the number of requesting nodes is one. The node receiving the permission signal immediately initiates the transfer of the data (packet) to be transmitted. On the other hand, the node which has lost the arbitration in the step S1406 and is rejected from the use of bus receives, from the root in a step S1409, a DP (data prefix) packet indicating the failure in arbitration, and the node having received such packet returns to the step S1401 and waits until the predetermined gap length is obtained, in order to issue again the request for using the bus.

Figure 22:
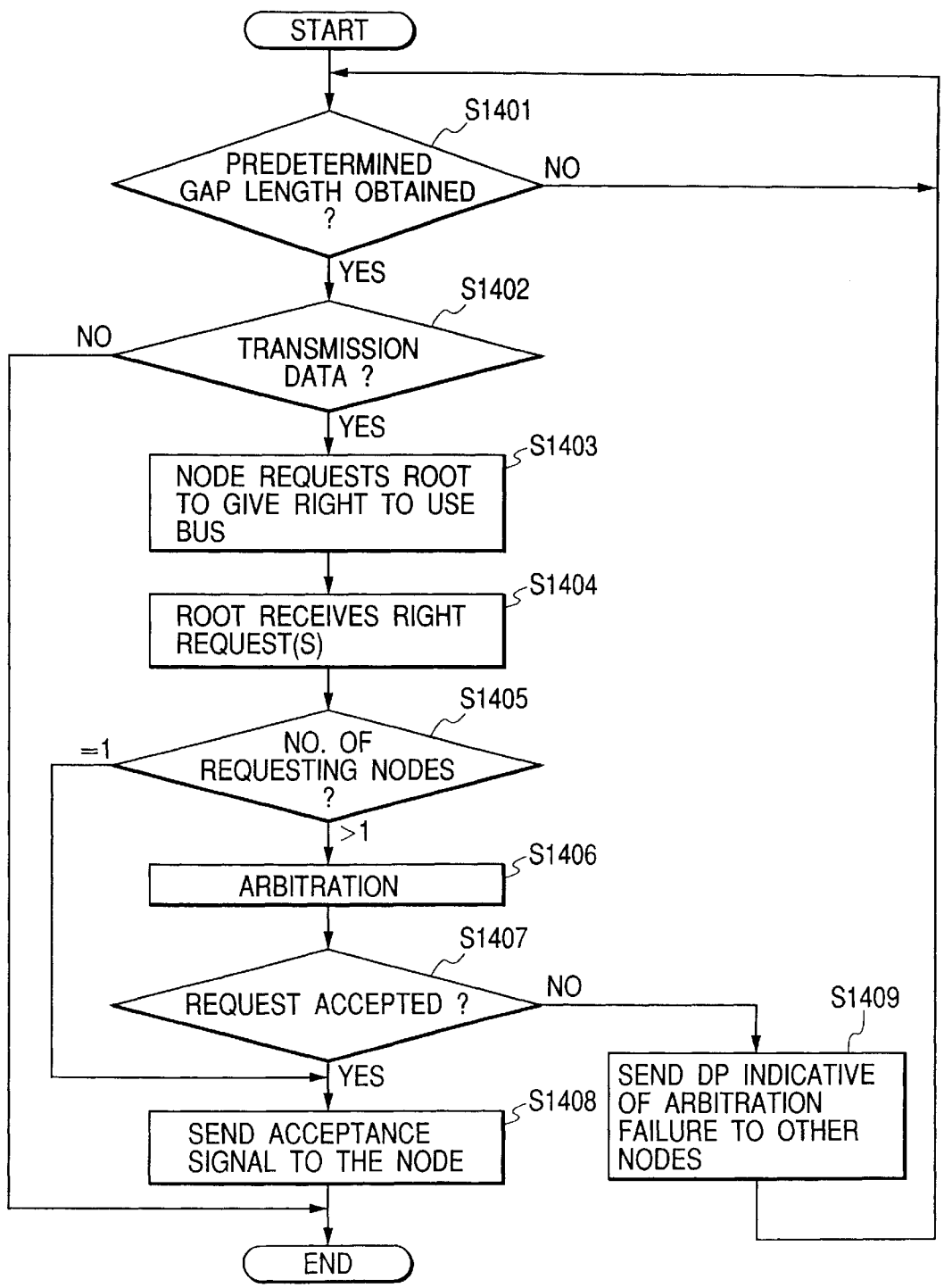
FIG. 22 is a flow chart for explaining arbitration.

The arbitrating process shown in FIG. 22 is executed as explained in the foregoing.

[Asynchronous Transfer]

Figure 14:
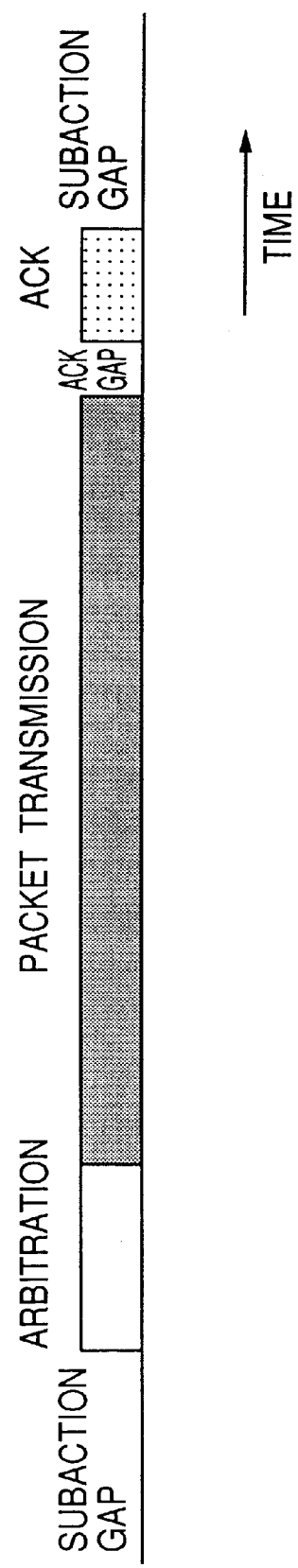
FIG. 14 is a view showing the basic phase transitions in time in asynchronous transfer.
Figure 15:
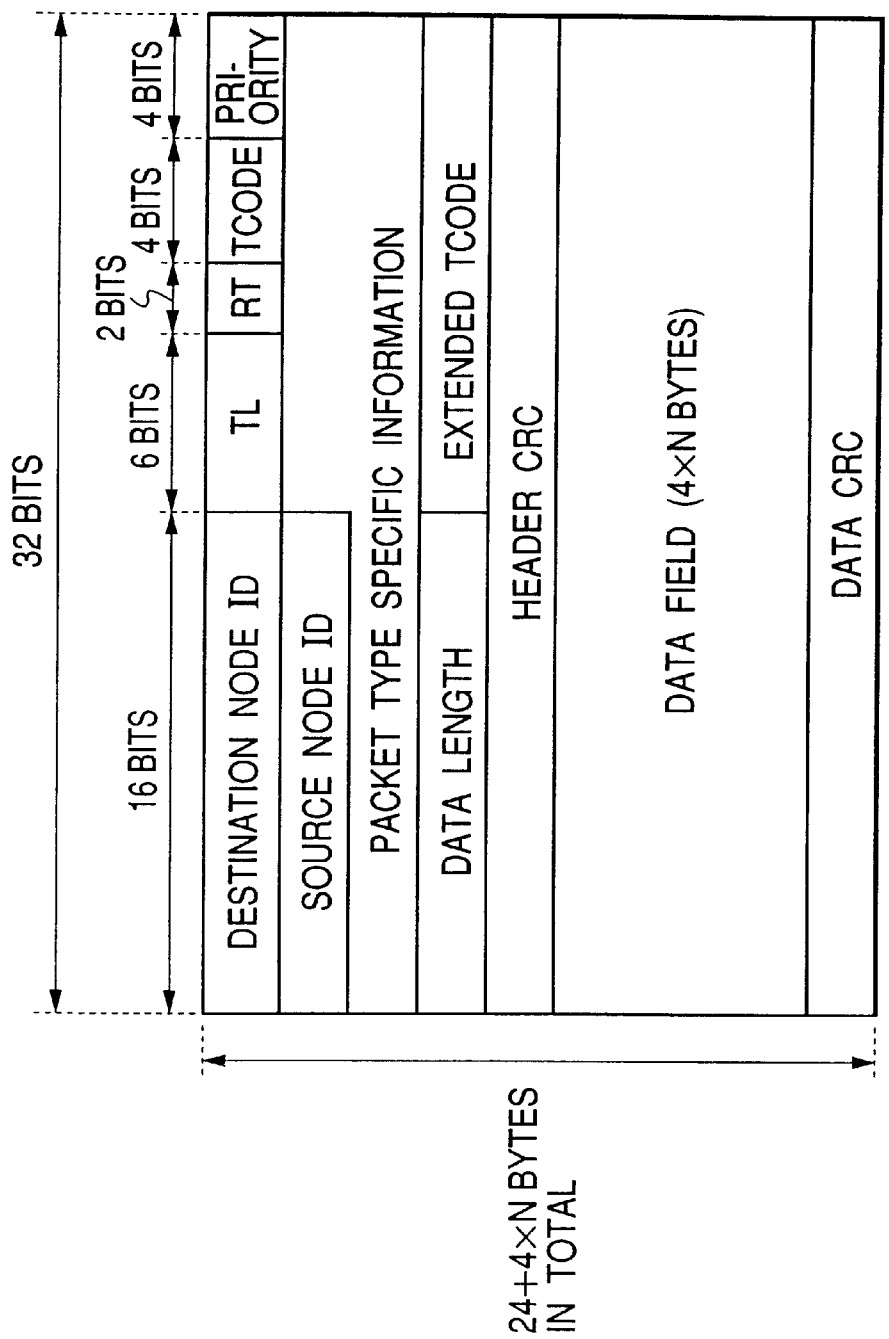
FIG. 15 is a view showing an example of the packet format in the asynchronous transfer.

The asynchronous transfer is a non-synchronized data transfer. FIG. 14 shows the phase changes in time in the asynchronous transfer. In FIG. 14, the initial subaction gap indicates the idle state of the bus. When this idle time reaches a predetermined value, the node wishing the data transfer judges that the bus is usable and requests the arbitration for acquiring the bus. When the permission for using the bus is acquired in the arbitration, the data transfer is executed in the packet format. After the data transfer, the transfer process is completed by the receiving node, by the sending of either an ack (acknowledging code) after a short ack gap or a response packet. The ack consists of 4-bit information and a 4-bit check sum, contains information indicating a success, a busy state or a pending state and is immediately returned to the transmitting node. FIG. 15 shows an example of the packet format in the asynchronous transfer.

The packet contains, in addition to a data portion and error correction data CRC, a header portion which contains a destination node ID, a source node ID, transfer data length and various codes. The asynchronous transfer is a 1-to-1 communication from the source node to the destination node. The packet transferred from the source node is delivered to all the nodes in the network, but is read only by the destination node since any node disregards the packet unless it is addressed to the own node.

The asynchronous transfer is executed in the above-explained manner.

[Isochronous Transfer]

The isochronous transfer is a synchronized data transfer. The isochronous transfer, constituting the most important feature of the 1394 serial bus, is particularly suitable for the data requiring real-time transfer, such as video image data or audio data. In contrast to the asynchronous transfer which is a 1-to-1 transfer, the isochronous transfer is conducted uniformly from the source node to all other nodes by the broadcasting function.

Figure 16:
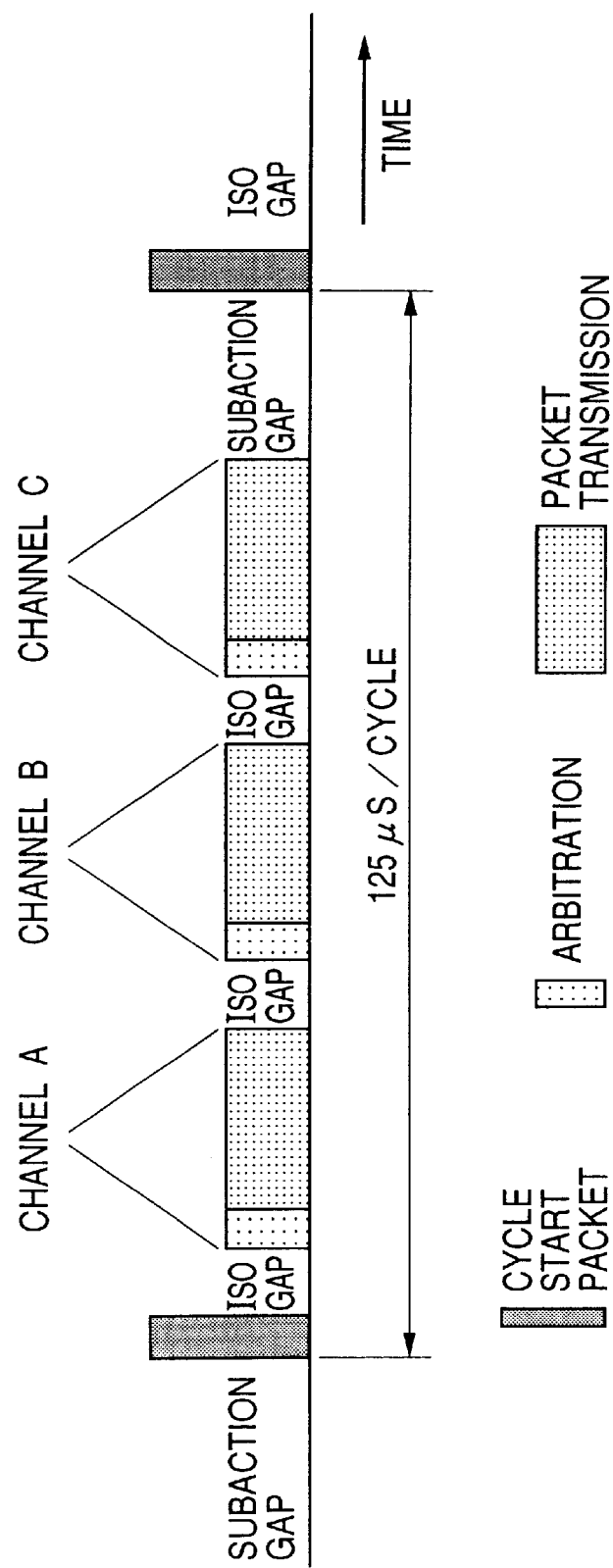
FIG. 16 is a view showing the basic phase transitions in time in asynchronous transfer.

FIG. 16 shows the phase changes in time in the isochronous transfer, which is executed at a predetermined interval on the bus. This interval is called the isochronous cycle, which is 125 $\mu$sec. A cycle start packet indicates the starting time of each cycle and adjust the time of each node. The cycle start packet is transmitted by a node called cycle master, which transmits the cycle start packet after a predetermined idle time (subaction gap) following the transfer in the preceding cycle. The cycle start packets are transmitted at an interval of 125 $\mu$s.

Also as indicated as channels A, B and C in FIG. 16, the packets of plural kinds can be transferred in distinguished manner within a cycle, by being given different channel ID's. Thus, real-time transfer can be simultaneously achieved among plural nodes, and the receiving node fetches the data of a desired channel ID only. The channel ID does not indicate the address of the destination, but merely gives a logic number to the data. Consequently any packet is transferred by broadcasting from a source node to all other nodes.

Prior to the transmission of the packet in the isochronous transfer, an arbitration is conducted as in the asynchronous transfer. However, as the isochronous transfer is not 1-to-1 communication, the ack (acknowledgment code) is not present in the isochronous transfer. In FIG. 16, iso gap (isochronous gap) indicates an idle time required, prior to the isochronous transfer, for identifying that the bus is idle. After the lapse of the predetermined idle time, the node wishing the isochronous transfer judges that the bus is idle and requests the arbitration before the transfer.

Figure 17:
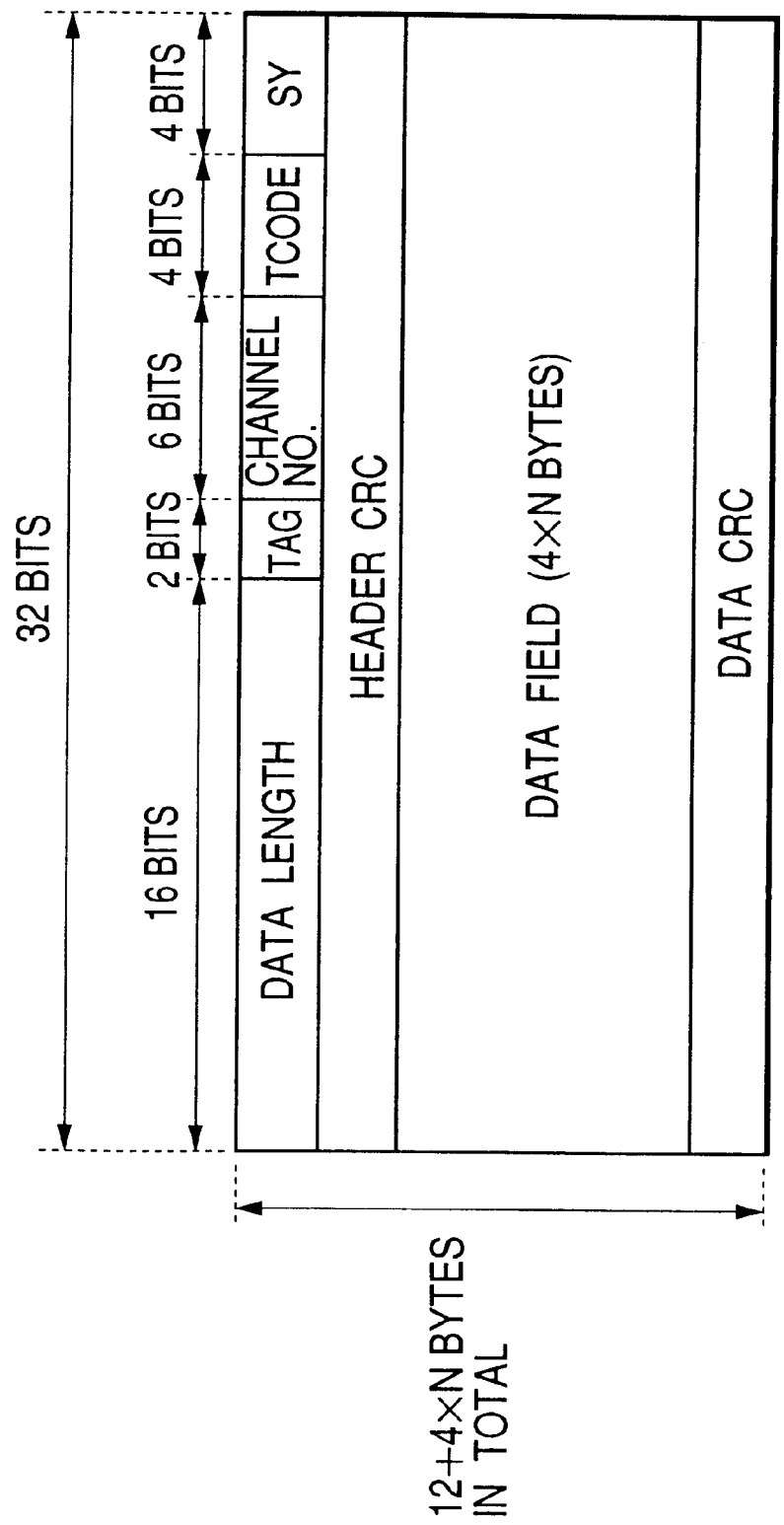
FIG. 17 is a view showing an example of the packet format in the asynchronous transfer.

FIG. 17 shows an example of the packet format for the isochronous transfer.

The packet divided in each channel contains, in addition to a data portion and error correction data CRC, a header portion which contains a transfer data length, a channel number, various codes and an error correcting header CRC.

The isochronous transfer is executed in the above-described manner.

[Bus Cycle]

Figure 18:
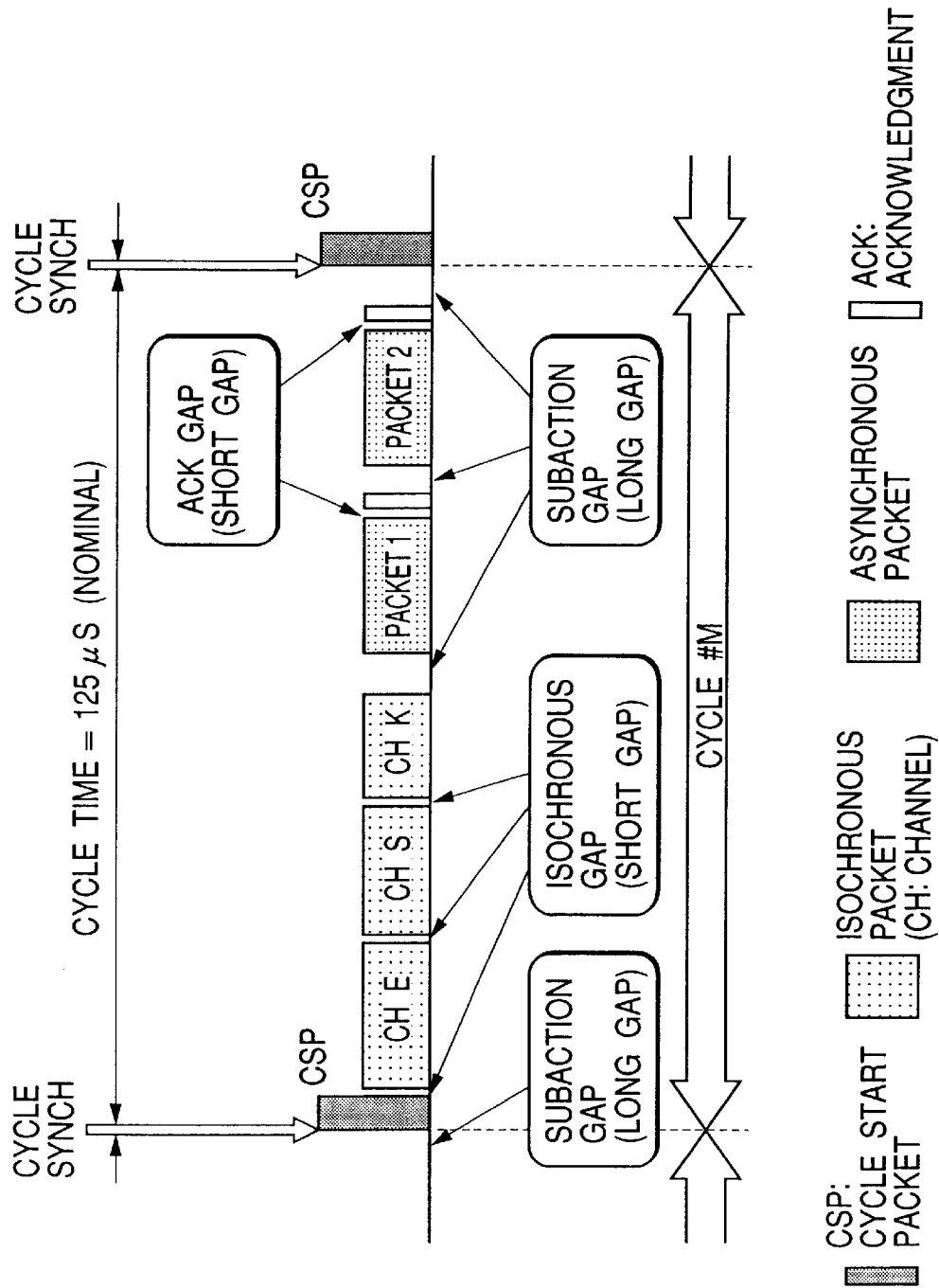
FIG. 18 is a view of an example of the bus cycle showing the state of the packet transferred on the actual 1394 serial bus.

On the actual 1394 serial bus, the isochronous transfer and the asynchronous transfer can be present in mixed manner. FIG. 18 shows the phase transitions in time of the transfer state on the bus, containing the isochronous transfer and the asynchronous transfer in mixed manner. The isochronous transfer is executed with priority, because, after the cycle start packet, the isochronous transfer can be activated with a gap length (isochronous gap) shorter than that (subaction gap) required for activating the asynchronous transfer. Consequently the isochronous transfer is executed with higher priority than the asynchronous transfer. In a general bus cycle shown in FIG. 18, the cycle start packet is transferred from the cycle master to the nodes at the start of a cycle #M. In response the nodes adjust the time, and, after the lapse of a predetermined idle time (isochronous gap), the nodes wishing the isochronous transfer execute arbitration and enter the packet transfer. In FIG. 18, the channels e, s and k are isochronous transferred in succession.

The process from the arbitration to the packet transfer is repeated for the number of given channels, and, after the completion of the isochronous transfers in the cycle #M, the asynchronous transfer is enabled. When the idle time reaches the subaction gap enabling the asynchronous transfer, the node wishing the asynchronous transfer judges that the arbitration can be started. However the asynchronous transfer can be executed only if the subaction gap for activating the asynchronous transfer can be obtained within the time from the termination of the isochronous transfer to the time of transfer of the next cycle start packet (cycle synch). In the cycle #m shown in FIG. 18, there are executed the isochronous transfer of three channels and the asynchronous transfer (including ack) of two packets (packet 1 and 2). After the asynchronous packet 2, there is reached the time (cycle synch) for starting the cycle m+1, so that the transfer in the cycle #m is terminated. However, if the time (cycle synch) for transmitting the next cycle start packet is reached in the course of an asynchronous or isochronous transfer, such transfer is not interrupted but the cycle start packet of the next cycle is transmitted after the lapse of the idle time following the completion of such transfer. Consequently, if a cycle is extended beyond 125 μs, the next cycle is correspondingly made shorter than the standard 125 μs. In this manner the isochronous cycle can be made longer or shorter than the standard 125 μs. However, the isochronous transfer is always executed in every cycle if required to maintain the real-time transfer, while the asynchronous transfer may be delayed to the next or later cycle by the shortening of the cycle time. Such delay is also managed by the cycle master. The IEEE1394 serial bus functions in the above-explained manner.

Now reference is made again to FIG. 1 for explaining the present invention.

Figure 2:
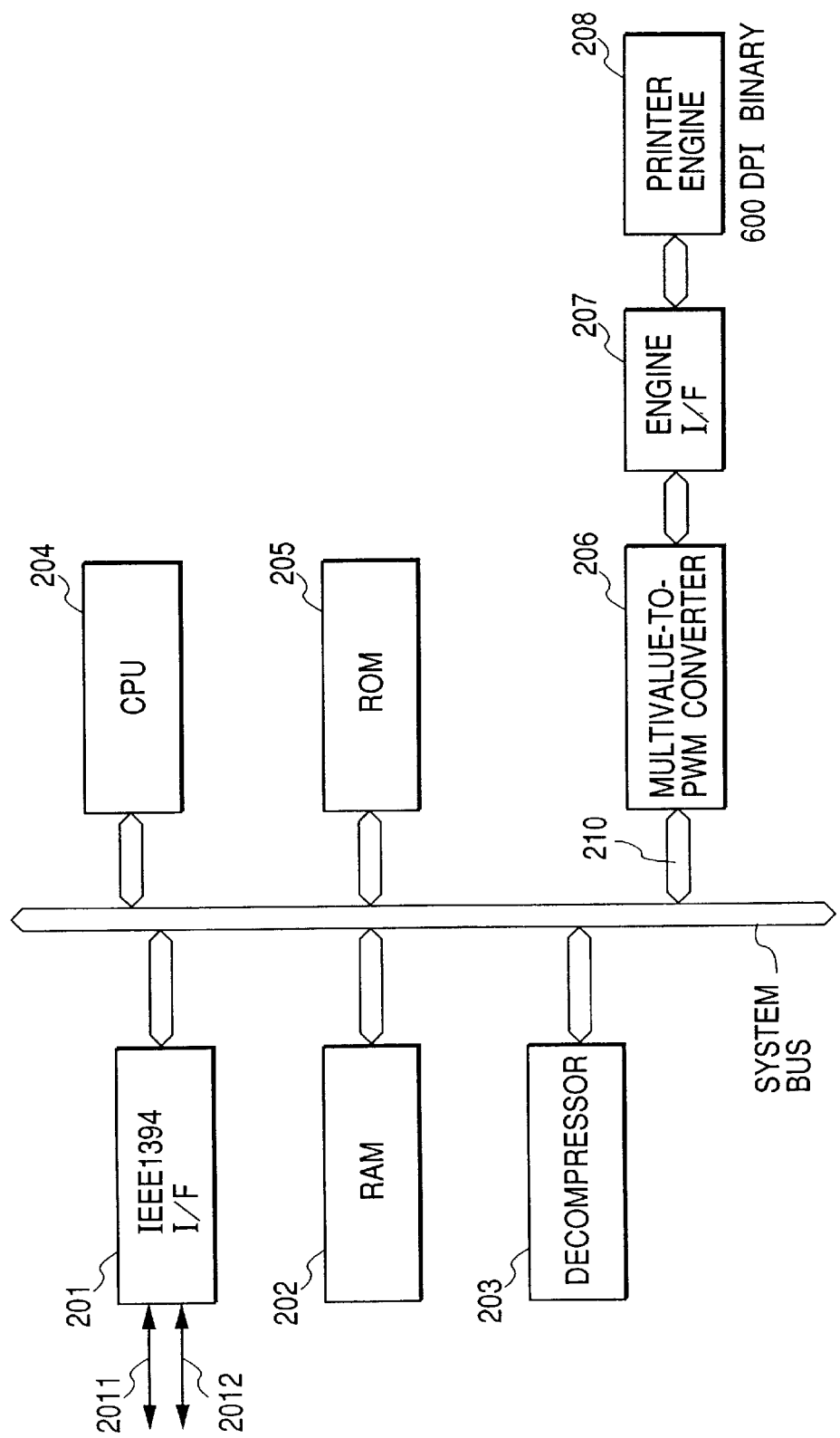
FIG. 2 is a block diagram of a printer embodying the present invention.
Figure 3:
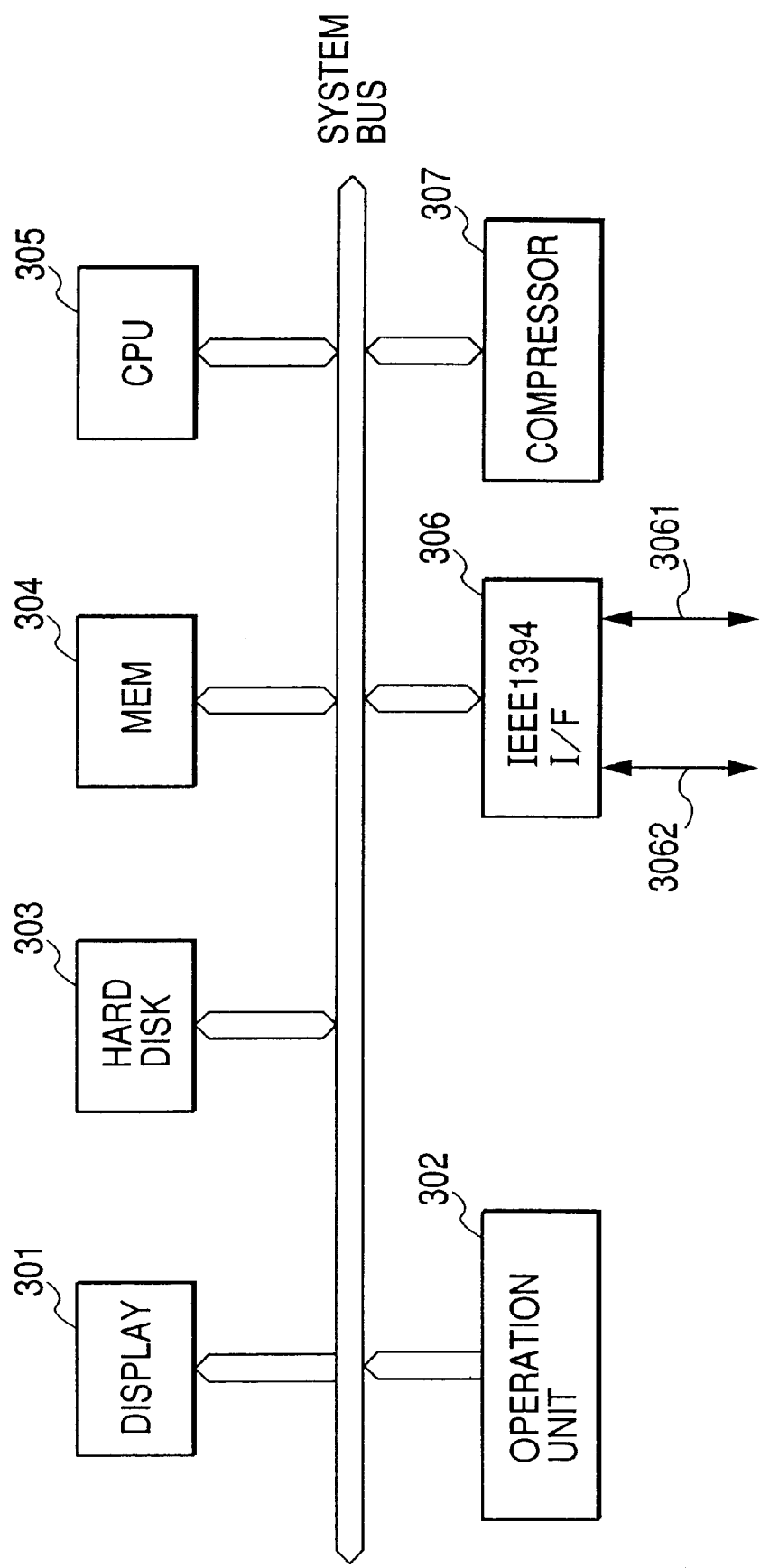
FIG. 3 is a block diagram of a host computer embodying the present invention.

FIG. 1 shows the connection state of a personal computer, a printer etc. Connected with the IEEE1394 I/F. FIG. 2 is a block diagram showing the interior of a printer 103, and FIG. 3 is a block diagram showing the interior of a personal computer 101. In FIG. 1 there are shown a personal computer 101, and a color laser beam printer 103.

Referring to FIG. 2 showing the configuration of the printer 103, there are shown an IEEE1394 I/F 201; a RAM 202; a decompressor 203 for expanding the compressed data, transferred through the IEEE1394 bus, to restore the original data; CPU 204; a ROM 205 for storing the operation program etc. of the CPU 204; a multi value-PWM conversion unit 206 for effecting pulse width modulation (PWM) on the multi-value image data transmitted from the personal computer, having a mode of converting 8-bit input data to 8 pulses corresponding to a pixel width and a mode converting 4-bit input data to 4 pulses corresponding a pixel width; a printer engine 208 for printing, on a printing sheet, the video data transmitted from the PWM conversion unit 206 through a printer engine I/F 207, and constituted in the present embodiment by a color page printer which receives and prints the CMYK image data in page sequential manner; and a printer engine I/F 207 for transmitting the video data to the printer engine 208 in synchronization with the horizontal and vertical sync signals supplied from the printer engine 208.

Referring to FIG. 3 showing the configuration of the personal computer 101, there are provided a display 301 such as a CRT; an operation unit 302 such as a keyboard; a hard disk 303; a memory 304; a CPU 305; an IEEE1394 I/F 306; and a compression unit 307 for data compression.

In the following there will be explained the functions of the PC and the printer of the present embodiment, with reference to FIGS. 1 to 3. On the PC 101, the user prepares text data to be printed by means of an application program, and the prepared data are stored in the hard disk 303.

When the printing of the text data is instructed from the operation unit 302, the CPU 305 executes functions according to a flow chart shown in FIG. 5. At first the CPU 305 analyzes and converts the text data into bit map data of a resolution and a gradation designated as default values and stores such data in the hard disk 303 (S51).

Then the CPU 305 inquires, by the asynchronous mode of the IEEE1394 bus, whether the printer 103 is in a printable state. The printer 103 responds to the inquiry (S52) as shown in S231 in FIG. 23.

The CPU 305 discriminates whether the text is printable based on the response from the printer 103, and, if printable, the sequence proceeds to a step S55, but, if not, the sequence to a step S54 (S53).

If the printer 103 is not in the printable state, the state is displayed on the display 301 and the sequence waits until the printer 103 becomes printable. For example, if the printer 103 is incapable of printing because of lack of paper, the display 301 shows "lack of paper" and the sequence waits until the printer reaches the printable state by the paper replenishment by the user (S54).

When the printer 103 becomes capable of printing, the CPU 305 sends the bit image data to the printer 103 by the isochronous mode of the IEEE1394 bus, and issues a request for isochronous communication to the bus master of the IEEE1394 bus in order to execute the printing operation (S55).

The sequence awaits the acquisition of the bus band width in response to the request, and, upon acquisition, the sequence proceeds to a next step (S56).

Then there is discriminated whether the acquired bus band width is sufficient for transferring the data (S57), and, if sufficient, a step S59 starts the printing process, but, if not, a step S58 executes a process to effect printing within the acquired bus band width.

The necessary bus band width may not always be secured since, on the IEEE1394 bus, the isochronous mode may also be utilized by other apparatus such as a digital camera or a digital video camera.

In the present embodiment, the printer is assumed to be a color (CMYK) page printer having a maximum resolution of 600 dpi, a maximum gradation of 256 levels and a printing speed of 15 ppm.

The data amount of A4-sized color (CMYK) data of 600 dpi and 256 gradation levels is about 4 Mb×8 (256 levels)×4 (CMYK)=about 128 Mbytes. The printer of the present embodiment, constituted by a page printer such as a laser beam printer with a RAM capacity limited to about 512 KB for cost reduction, can store only a part of the image data of a page.

Consequently, once the printer 103 starts the printing operation, the data transfer cannot be interrupted, and the proper print cannot be obtained unless the data transfer is completed within a predetermined time.

In the example of the present embodiment, because the printing is executed with a speed of 15 ppm, the data of about 128 Mbyte have to be transferred from the PC 101 to the printer 103 within a time of 60 (seconds)/15=4 seconds.

As the transfer rate is 32 Mbyte/s(=128/4)=256 Mbit/s, it occupies a considerable portion of the bus band even in the IEEE1394 bus with the transfer rate of 400 Mbps at maximum.

Stated differently, it is considerably probable that such wide bus band cannot be secured. The bus band acquired in the arbitration varies in each arbitration, depending on the apparatus connected to the 1394 bus and how such apparatus are used. If many apparatus wish data transfer of a large amount, the bus band width acquirable per apparatus basically becomes narrower. For this reason, in the present invention, the printer can select, in addition to the aforementioned mode of receiving the data of 600 dpi and 256 gradation levels, modes of data transfer with a smaller band width, for example a mode of receiving the data at 600 dpi and 16 gradation levels (bus band width being halved to 129 Mbit/s) or a mode of receiving data at 300 dpi and 256 gradation levels (bus band width being reduced to ¼ or 64 Mbit/s).

The CPU 305 of the PC 101 functions in the following manner in order to effect the printing in the acquired bus band width:

1) In case the acquired bus band width is larger than the bus band width required in the default mode:

The image data are read from the hand disk 303 and are printed by transfer to the printer 103 in the isochronous mode of the IEEE1394 bus in the default mode through the IEEE1394 I/F 306. FIG. 4A shows an example of the format of the transmitted image data (S59) (corresponding to the content of the data field in FIG. 15).

In this case, as the image data are not compressed, the compression flag in FIG. 4A is 0. The printer 103 decides to use the decompressor 206 or not, according to this compression flag.

2) In case the acquired bus band width is smaller than the bus band width required in the default mode:

1) The image data are read from the hard disk 303 and compressed by the compressor 307, by a reversible compression such as packbits, and the compressed image data are again stored in the hard disk 303 (S58 in FIG. 5).

Then there is discriminated whether the compressed image data becomes smaller than the bus band width (S511 in FIG. 6).

If the necessary bus band width becomes smaller than the acquired bus band width, the compressed data can be transmitted. The compression flag shown in FIG. 4A is set at 1, and the image data are read from the hard disk 303 and are printed by transfer to the printer 103 in the isochronous mode of the IEEE1394 bus through the IEEE1394 I/F 306 (S59 in FIG. 5).

For example if the image data of 128 Mbytes can be compressed to ½ or 64 Mbytes (necessary bus band width being 128 Mbit/s) and if the acquired bus band width is 150 Mbit/s, the compressed image data can be transmitted to the printer 103. The printer 103 expands the compressed image data in the decompressor 203 and executes printing in the printer engine 208. If the result of compression is not smaller than the acquired bus band width, the sequence proceeds to a step S512 in FIG. 6.

2) Then there is discriminated whether the printing is possible by a change of the mode (S512 in FIG. 6). If possible, the sequence proceeds to a step S514 for changing the mode. On the other hand, if the printing is not possible even with the change of the mode, the sequence proceeds to a step S513 for displaying that the printing is not possible.

If the printing is judged possible by the change of mode, the printable mode is displayed on the display 301 (S514 in FIG. 6). FIG. 28 shows an example of such display. The default conditions are 600 dpi and 256 gradation levels (requiring a bus band width of 256 Mbit/s) but there can only be acquired a narrower bus band width of 150 Mbit/s, and there is requested the selection of a mode with 600 dpi and 16 gradation levels (requiring a bus band width of 128 Mbit/s) or a mode with 300 dpi and 256 gradation levels (requiring a bus band width of 64 Mbit/s).

There is awaited a selection by the user, among the modes shown in FIG. 28, of a print mode different from the default mode (S515 in FIG. 6). If the cancellation of the displayed message is instructed, indicating that the printing in the different mode is not executed, the sequence is terminated without the printing operation (S516 in FIG. 6).

If a mode is selected by the user, a mode setting command is sent to the printer 103 by the asynchronous mode of the IEEE1394 to change the operation mode thereof (S517 in FIG. 6).

FIG. 4B shows an example of the mode setting command from the PC 101 to the printer 103. The command is in fact contained in the packet of the async mode, but parts other than the command data are omitted. In response to the mode setting command, the printer 103 changes the operation mode by changing the setting of a register in the multi value-PWM conversion unit 206 as will be explained later.

Then the PC 101 reads and loads the image data from the hard disk 303 into the memory 304, converts the data into the resolution and gradation selected by the user and again stores the converted data in the hard disk 303 (S518 in FIG. 6).

Then the PC 101 reads the image data from the hard disk 303 and sends the converted image data to the printer 103 for printing, by the isochronous mode through the IEEE1394 I/F 306.

It is also conceivable to set in advance the order of priority for the resolutions and gradation levels, and, if the printing cannot be executed in a mode, to automatically select another mode of printing with different resolution and gradation without awaiting the command from the user. In the above-described example, by giving first priority to the mode with 600 dpi and 256 gradation levels, second priority to the mode with 600 dpi and 16 gradation levels and third priority to the mode with 300 dpi and 256 gradation levels, the second priority is automatically selected for the acquired bus band width of 150 Mbyte/s as the bus band width is insufficient for the first priority.

In case the bus band width is still insufficient even after the packbits compression, it is also conceivable, instead of changing the resolution and number of gradation levels from the beginning, to at first change the compression method to an irreversible compression of higher efficiency such as jpeg compression and to employ such compression if the data amount can be accommodated in the acquired bus band width, but, if the data amount is still too large, then to proceed to the change in the resolution and the number of gradation levels.

3) If the bus band width acquired in S512 is judged too small for printing on the printer 103 even with a change in the operation mode, a message indicating such disabled printing state is displayed on the display unit 301, requesting the user to check other apparatus in data communication utilizing the IEEE1394 bus (S513 in FIG. 6). Consequently the printing is not executed in this situation.

Figure 23:
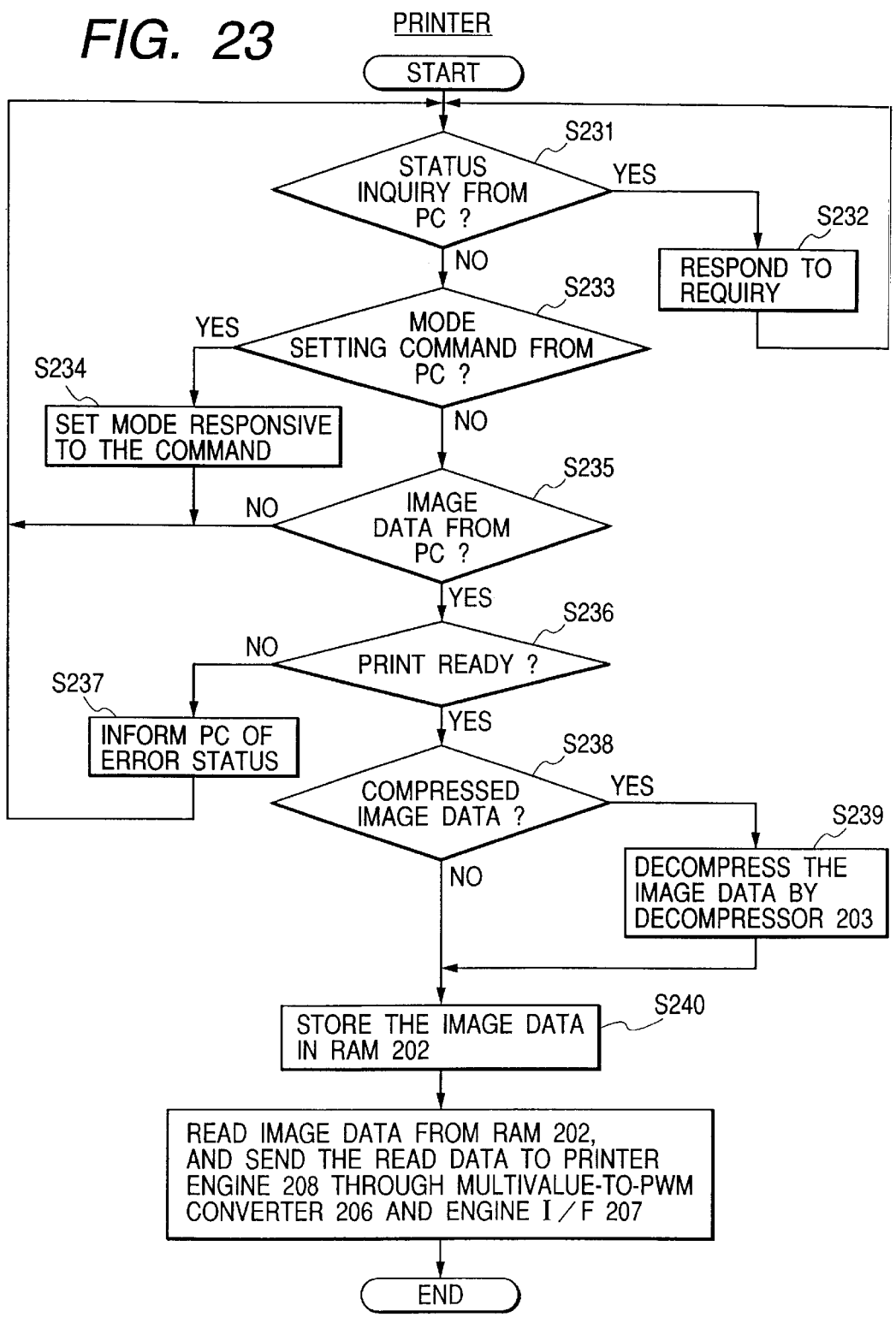
FIG. 23 is a flow chart showing the flow of functions in a printer embodying the present invention.

On the other hand, the printer 103 controlled by a CPU 204, according to the inquiry, mode setting command and compressed information transmitted from the PC 101, and the functions of the printer under such control will be explained with reference to FIG. 23.

At first there is discriminated whether an inquiry (status request) has been sent from the PC 101 (S231).

If sent, status information corresponding to the requested status is returned to the PC 101 (S232) and the sequence returns to the step S231 for awaiting the status request.

The status information indicates, for example, whether the printer engine is in a printable state, and, if not, what is the cause.

If the step S231 identifies the absence of status request, there is discriminated whether a mode setting command has been sent from the PC 101 (S233).

If sent, mode setting is executed according to the content of the command (S234), and the sequence returns to the step S231 for awaiting the status request.

The mode setting changes the setting of the register of the multi value-PWM conversion unit 206, and this is the setting of the internal operation mode.

If the step S233 identifies the absence of mode setting command, there is discriminated whether image data have been sent from the PC 101 (S235). If not, the sequence returns to the step S231 for awaiting the status request.

Then there is discriminated whether the printing is enabled. The print enabled state means a state in which the printing is judged possible, based on various conditions such as whether the printer paper is present, whether the printing media such as ink or toner are present and whether the jam state is absent. The sequence proceeds to the printing process or a step S237 respectively if the printing is enabled or not (S236).

If the printing is judged not possible, an error is informed to the PC 101 and the sequence returns to the step S231 for awaiting the status request (S237).

Then there is discriminated whether the transferred image data are compressed (S238).

If compressed, the compressed image data are expanded through the decompressor 203 (S239).

When the expanded image data or the image data not requesting the expansion are obtained, such data are stored in the RAM 202 (S240).

Then the image data stored in the RAM 202 are read and subjected to the printing process, which will be explained in the following with reference to FIGS. 24 to 27.

Figure 24:
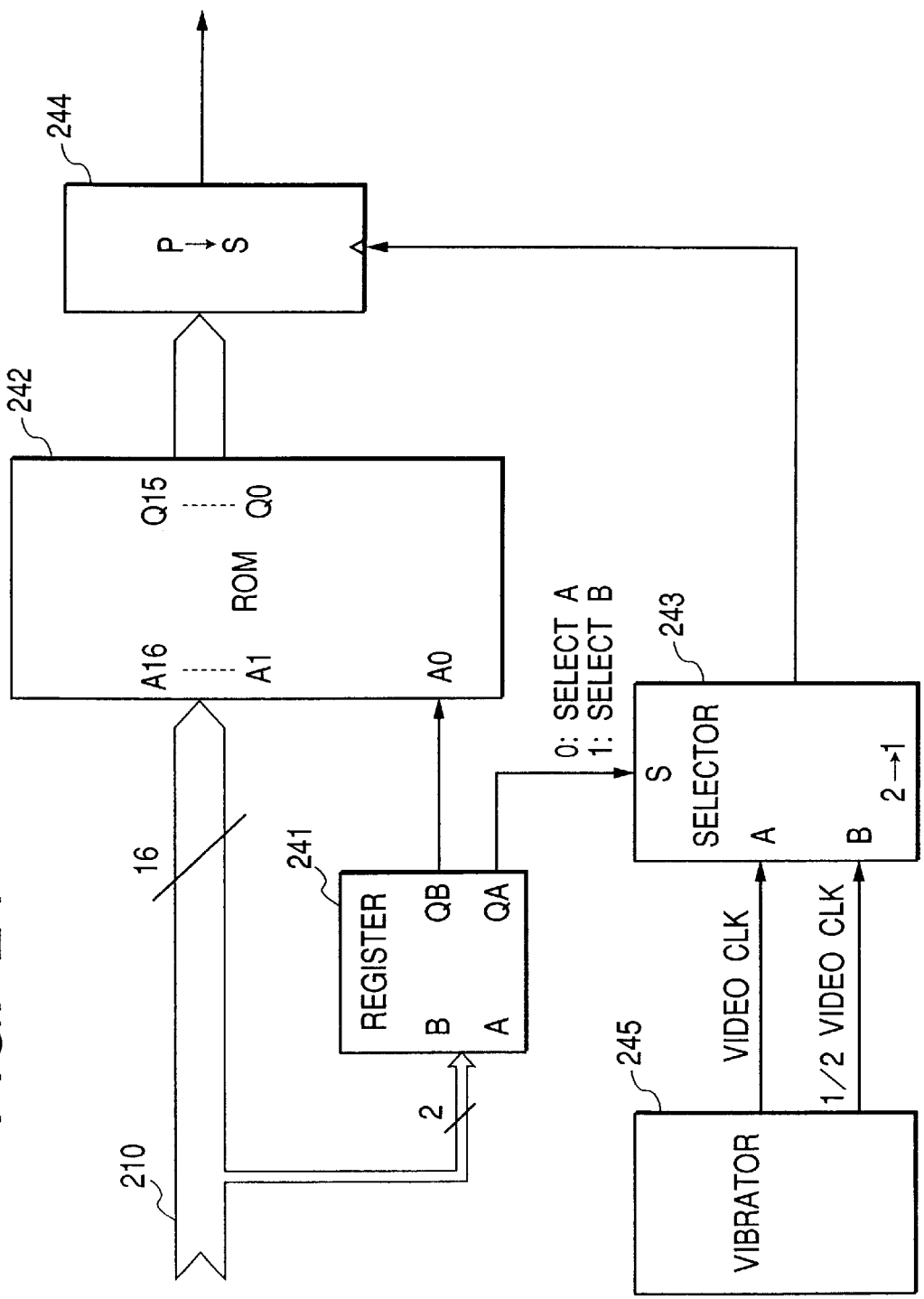
FIG. 24 is a block diagram of a multi value-to-PWM conversion unit 206.

FIG. 24 is a block diagram of the multi value-PWM conversion unit, wherein a 20 bit register 241 for mode setting has inputs B and A, respectively corresponding to outputs QB and QA. The output QB is supplied to the address A0 of a RAM 242, for selecting either a mode of 256 gradation levels (8-bit data) or a mode of 16 gradation levels (4-bit data). A ROM 242 having 17-bit inputs (A0–A16) and 16-bit outputs (consequently having a capacity of 256 Kbytes) is adapted, in the 256-gradation level mode, to receive 2 pixels of multi-value data of 8 bits per pixel and to output 2 pixels of PWM data of 8 bits per pixel, and, in the 16-gradation level mode, to receive 4 pixels of multi-value data of 4 bits per pixel and to output 4 pixels of PWM data of 4 bits per pixel. A 2-to-1 selector 243 receives the output QA of the register 241 as a selection input and outputs either one of the two clock signals (VIDEO CLK, ½VIDEO CLK9 of the vibrator 245). A parallel/serial converter 244 receives the 16-bit parallel outputs of the ROM 242 and outputs these signals as serial data, using the output of the selector 243 as the carrier clock. A vibrator 245 generates clock signals of two frequencies, in which ½VIDEO CLK has a frequency equal to ½ of that of VIDEO CLK.

Image data (210) are transmitted from the system bus to the address inputs A1–A16 of the ROM 242. On the other hand, 2 lower bits of the data 210 are supplied to a register 241 and are used for selecting the operation mode of the multi value-PWM conversion unit 206 according to the operation setting command supplied from the PC 101.

FIG. 25 is a table showing the relationship between the setting and the operation mode of the register 241. In FIG. 25, 251 and 252 respectively indicate the 2-bit outputs QA, QB of the register 241, and the output QA becomes the input A0 of the ROM 242 while QB becomes the selecting input of the selector 243.

Referring to FIG. 25:

1) In case of QA=0 and QB=0, there are selected resolution of 600 dpi and 256 gradation levels, in which case A0 input=0 and selector input=0. FIG. 26 is a table showing the content stored in the ROM 242. As the above-mentioned mode has 256 gradation levels, each pixel is represented by 8-bit data. As the bus 210 is of 16 bits, the data of 2 pixels are sent to the inputs A1–A16 of the ROM 702 (A1–A8 being the first pixel and A9–A16 being the second pixel). On the other hand, as regards the PWM output, P00–P07 as the first pixel and P10–P17 as the second pixel are released as the ROM outputs D0–D15. Each PWM output of 8 bits represents the gradation levels of the 8-bit multi-value input data.

In the above-mentioned mode, the selector 243 selects the VIDEO CLK, of which frequency is 8 times of that of the clock signal for a pixel of 600 dpi.

Figure 27:
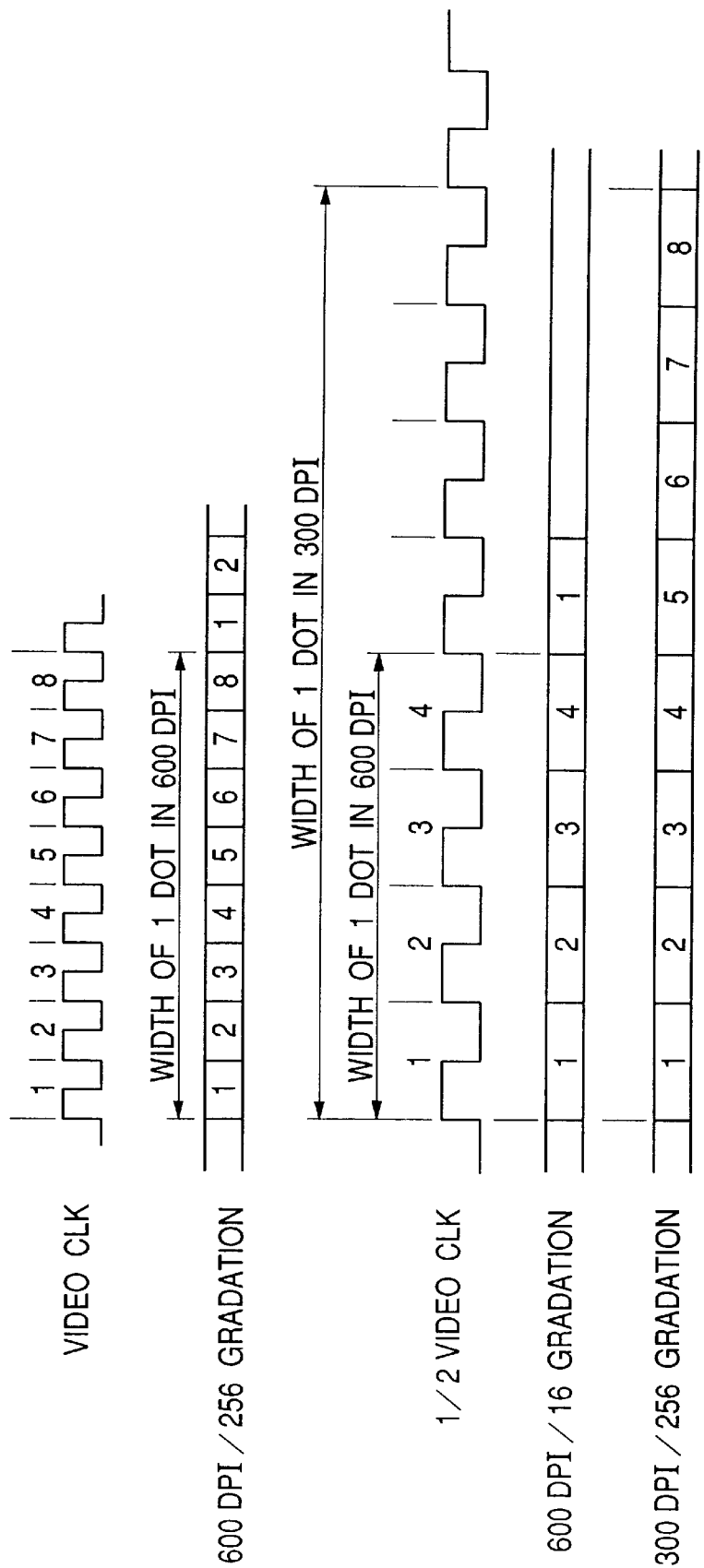
FIG. 27 is a timing chart showing the relationship among the VIDEO CLOCK, resolution and number of gradation levels.

FIG. 27 is a timing chart showing the relationship among the frequency of VIDEO CLK, resolution and number of gradation levels. As shown in FIG. 27, the 8-bit output of the ROM 241 is converted in the parallel/serial converter 244 by the VIDEO CLK signal of 8 clocks into serial data, which are sent to the printer engine I/F 207 and are printed in the printer engine 208.

2) In case of QA=0 and QB=1, there are selected resolution of 300 dpi and 256 gradation levels, in which case A0 input=0 and selector input=1. In this case the process in the ROM 242 is same as in the mode with 600 dpi and 256 gradation levels but the selector 243 selects the ½VIDEO CLK, whereby the printer engine executes printing with a resolution of 300 dpi in the main scanning direction. In the sub scanning direction, a resolution of 300 dpi is realized by sending same data twice from the RAM 202 to the multi value-PWM conversion unit 206.

3) In case of QA=1 and QB=1, there are selected resolution of 600 dpi and 16 gradation levels, in which case A0 input=1 and selector input=1. As the present mode has 16 gradation levels, each pixel is represented by 4-bit data. As the bus 210 is of 16 bits, the data of 4 pixels are sent to the inputs A1–A16 of the ROM 242 (A1–A4 being the first pixel, A5–A8 being the second pixel, A9–A12 being the third pixel and A13–A16 being the fourth pixel). On the other hand, as regards the PWM output, P00–P03 as the first pixel, P10–P13 as the second pixel, P20–P23 as the third pixel and P30–P37 as the fourth pixel are released as the ROM outputs D0–D15. Each PWM output of 4 bits represents the gradation levels of the 4-bit multi-value input data. In the present mode, the selector 243 selects the ½VIDEO CLK, of which frequency is 4 times of that of the clock signal for a pixel of 600 dpi. As shown in FIG. 27, the 4-bit output of the ROM 241 is converted in the parallel/serial converter 244 by the VIDEO CLK signal of 4 clocks into serial data, which are sent to the printer engine I/F 207 and are printed in the printer engine 208.

As explained in the foregoing, the CPU 204 of the printer 103 changes the operation mode according to the mode setting command supplied from the personal computer, and, stores the image data, transferred from the PC 101 in the isochronous mode of IEEE1394, into the RAM 202 either through the decompressor 203 or directly respectively if the transferred image data are compressed or not, then reads and sends the image data in succession from the RAM 203 to the multi value-PWM conversion unit 206 for effecting the PWM modulation according to the operation mode, and sends the modulated data through the printer engine I/F 207 to the printer engine 208 for printing.

As explained in the foregoing, the present embodiment allows stable printing even when the IEEE1394 bus is congested, by changing the set mode according to the acquired bus band width.

As explained in the foregoing, the present invention enables the data transfer of an amount corresponding to the data amount of available synchronized transfer. Consequently, the data of a high resolution and a large number of gradation levels are transferred in case a large transferable data amount is secured, but, in case only a smaller transferable data amount can be secured, data can still be securely transferred although the resolution and the number of gradation levels are lowered. Particularly in case of data transfer with the IEEE1394 serial bus, the present invention is more effective because the transferable data amount is not determined uniquely but is variable according to the magnitude of the acquired bus band width.

Also in case the data of a high resolution and a large number of gradation levels can be sufficiently transferred by data compression, it is preferable to effect the data transfer with such compression, so that, the data can be printed without unnecessarily deteriorating the image quality by judging at first whether the data can be compressed, before considering to sacrifice the resolution and the number of gradation levels.

As the data compression or the reduction of resolution and/or number of gradation levels results in a deterioration in the image quality, such process may be informed to the user in advance and selected by the user for obtaining appropriate judgment.

What is claimed is:

1. An information processing apparatus comprising:

a first discrimination unit, arranged to discriminate whether transmission in a predetermined mode of image data is executable in an obtained band width;

a first transmission unit, arranged to transmit the image data in the predetermined mode if said first discrimination unit discriminates that transmission in the predetermined mode in the obtained band width is executable;

a second discrimination unit, arranged to discriminate whether transmission is executable with a mode change if said first discrimination unit discriminates that transmission in the obtained band width is not executable;

a display unit, arranged to display at least one mode in which transmission in the obtained band width is executable if said first discrimination unit discriminates that transmission in the predetermined mode in the obtained band width is not executable, wherein said display unit displays the at least one mode if said second discrimination unit discriminates that transmission is executable with the mode change, and said display unit displays a message indicating that transmission of the image data is not executable if said second discrimination unit discriminates that transmission is not executable with the mode change;

a changing unit, arranged to change the image data in accordance with one mode selected from the at least one mode displayed by said display unit; and a second transmission unit, arranged to transmit the image data changed by said changing unit.

2. An apparatus according to claim 1, further comprising a compression unit, arranged to compress the image data if said first discrimination unit discriminates that transmission in the predetermined mode in the obtained band width is not executable, and a third discrimination unit, arranged to discriminate whether transmission of the image data compressed by said compression unit is executable in the obtained band width.

3. An apparatus according to claim 1, wherein said first and second transmission units transmit the image data to a printer.

4. An apparatus according to claim 1, wherein the obtained band width comprises a band width obtained by sending an isochronous request to an IEEE 1394 bus master.

5. An information processing apparatus comprising:

a first discrimination unit, arranged to discriminate whether transmission of image data is executable in an obtained band width;

a first transmission unit, arranged to transmit the image data if said first discrimination unit discriminates that transmission in the obtained band width is executable;

a compression unit, arranged to compress the image data if said first discrimination unit discriminates that transmission in the obtained band width is not executable;

a second discrimination unit, arranged to discriminate whether transmission of the image data compressed by said compression unit is executable in the obtained band width;

a second transmission unit, arranged to transmit the image data compressed by said compression unit if said second discrimination unit discriminates that transmission in the obtained band width is executable;

a changing unit, arranged to change a resolution or gradation of the compressed image data if said second discrimination unit discriminates that transmission in the obtained band width is not executable; and a third transmission unit, arranged to transmit the image data with the resolution or gradation changed by said changing unit.

6. An information processing method, comprising the steps of:

a first discrimination step of discriminating whether transmission of image data is executable in a predetermined mode in an obtained band width;

a first transmission step of transmitting the image data if said first discrimination step discriminates that transmission in the predetermined mode in the obtained band width is executable;

a second discrimination step of discriminating whether transmission is executable with a mode change if said first discrimination step discriminates that transmission in the predetermined mode in the obtained band width is not executable;

a display step of displaying at least one mode in which transmission in the obtained band width is executable if said first discrimination step discriminates that transmission in the predetermined mode in the obtained band width is not executable, wherein said display step displays the at least one mode if said second discrimination step discriminates that transmission is executable with the mode change, and said display step displays a message indicating that transmission of the image data is not executable if said second discrimination step discriminates that transmission is not executable with the mode change;

a changing step of changing the image data in accordance with one mode selected from the at least one mode displayed by said display step; and a second transmission step of transmitting the image data changed by said changing step.

7. A method according to claim 6, further comprising a compression step of compressing the image data if said first discrimination step discriminates that transmission in the predetermined mode in the obtained band width is not executable, and a third discrimination step of discriminating whether transmission of the image data compressed by said compression step is executable in the obtained band width.

8. A method according to claim 6, wherein said first and second transmission steps transmit the image data to a printer.

9. A method according to claim 6, wherein the obtained band width comprises a band width obtained by sending an isochronous request to an IEEE 1394 bus master.

10. An information processing method, comprising the steps of:

a first discrimination step of discriminating whether transmission of image data is executable in an obtained band width;

a first transmission step of transmitting the image data if said first discrimination step discriminates that transmission in the obtained band width is executable;

a compression step of compressing the image data if said first discrimination step discriminates that transmission in the obtained band width is not executable;

a second discrimination step of discriminating whether transmission of the image data compressed by said compression step is executable in the obtained band width;

a second transmission step of transmitting the image data compressed by said compression step if said second discrimination step discriminates that transmission in the obtained band width is executable;

a changing step of changing a resolution or gradation of the compressed image data if said second discrimination step discriminates that transmission in the obtained band width is not executable; and a third transmission step of transmitting the image data with the resolution or gradation changed by said changing step.

11. Computer-executable process steps for an information processing method, the executable process steps comprising:

a first discrimination step of discriminating whether transmission of image data is executable in a predetermined mode in an obtained band width;

a first transmission step of transmitting the image data if said first discrimination step discriminates that transmission in the predetermined mode in the obtained band width is executable;

a second discrimination step of discriminating whether transmission is executable with a mode change if said first discrimination step discriminates that transmission in the predetermined mode in the obtained band width is not executable;

a display step of displaying at least one mode in which transmission in the obtained band width is executable if said first discrimination step discriminates that transmission in the predetermined mode in the obtained band width is not executable, wherein said display step displays the at least one mode if said second discrimination step discriminates that transmission is executable with the mode change, and said display step displays a message indicating that transmission of the image data is not executable if said second discrimination step discriminates that transmission is not executable with the mode change;

a changing step of changing the image data in accordance with one mode selected from the at least one mode displayed by said display step; and a second transmission step of transmitting the image data changed by said changing step.

12. Computer-executable process steps according to claim 11, further comprising a compression step of compressing the image data if said first discrimination step discriminates that transmission in the predetermined mode in the obtained band width is not executable, and a third discrimination step of discriminating whether transmission of the image data compressed by said compression step is executable in the obtained band width.

13. Computer-executable process steps according to claim 11, wherein said first and second transmission steps transmit the image data to a printer.

14. Computer-executable process steps according to claim 11, wherein the obtained band width comprises a band width obtained by sending an isochronous request to an IEEE 1394 bus master.

15. Computer-executable process steps for an information processing method, the executable process steps comprising:

a first discrimination step of discriminating whether transmission of image data is executable in an obtained band width;

a first transmission step of transmitting the image data if said first discrimination step discriminates that transmission in the obtained band width is executable;

a compression step of compressing the image data if said first discrimination step discriminates that transmission in the obtained band width is not executable;

a second discrimination step of discriminating whether transmission of the image data compressed by said compression step is executable in the obtained band width;

a second transmission step of transmitting the image data compressed by said compression step if said second discrimination step discriminates that transmission in the obtained band width is executable;

a changing step of changing a resolution or gradation of the compressed image data if said second discrimination step discriminates that transmission in the obtained band width is not executable; and a third transmission step of transmitting the image data with the resolution or gradation changed by said changing step.

16. A computer-readable medium on which are stored computer-executable process steps for an information processing method, the executable process steps comprising:

a first discrimination step of discriminating whether transmission of image data is executable in a predetermined mode in an obtained band width;

a first transmission step of transmitting the image data if said first discrimination step discriminates that transmission in the predetermined mode in the obtained band width is executable;

a second discrimination step of discriminating whether transmission is executable with a mode change if said first discrimination step discriminates that transmission in the obtained band width is not executable;

a display step of displaying at least one mode in which transmission in the obtained band width is executable if said first discrimination step discriminates that transmission in the predetermined mode in the obtained band width is not executable, wherein said display step displays the at least one mode if said second discrimination step discriminates that transmission is executable with the mode change, and said display step displays a message indicating that transmission of the image data is not executable if said second discrimination step discriminates that transmission is not executable with the mode change;

a changing step of changing the image data in accordance with one mode selected from the at least one mode displayed by said display step; and a second transmission step of transmitting the image data changed by said changing step.

17. A computer-readable medium according to claim 16, further comprising a compression step of compressing the image data if said first discrimination step discriminates that transmission in the predetermined mode in the obtained band width is not executable, and a third discrimination step of discriminating whether transmission of the image data compressed by said compression step is executable in the obtained band width.

18. A computer-readable medium according to claim 16, wherein said first and second transmission steps transmit the image data to a printer.

19. A computer-readable medium according to claim 16, wherein the obtained band width comprises a band width obtained by sending an isochronous request to an IEEE 1394 bus master.

20. A computer-readable medium for an information processing method, the executable process steps comprising:

a first discrimination step of discriminating whether transmission of image data is executable in an obtained band width;

a first transmission step of transmitting the image data if said first discrimination step discriminates that transmission in the obtained band width is executable;

a compression step of compressing the image data if said first discrimination step discriminates that transmission in the obtained band width is not executable;

a second discrimination step of discriminating whether transmission of the image data compressed by said compression step is executable in the obtained band width;

a second transmission step of transmitting the image data compressed by said compression step if said second discrimination step discriminates that transmission in the obtained band width is executable;

a changing step of changing a resolution or gradation of the compressed image data if said second discrimination step discriminates that transmission in the obtained band width is not executable; and a third transmission step of transmitting the image data with the resolution or gradation changed by said changing step.

* * * * *